United States Patent
Lee et al.

(10) Patent No.: US 11,131,854 B2
(45) Date of Patent: Sep. 28, 2021

(54) ELECTRONIC DEVICE

(71) Applicant: LG ELECTRONICS INC., Seoul (KR)

(72) Inventors: Haklim Lee, Seoul (KR); Jaesuk Yoo, Seoul (KR); Sanghyuk Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 16/656,463

(22) Filed: Oct. 17, 2019

(65) Prior Publication Data

US 2020/0089003 A1 Mar. 19, 2020

(30) Foreign Application Priority Data

Aug. 30, 2019 (KR) .......................... 10-2019-0107759

(51) Int. Cl.
*G02B 27/01* (2006.01)
*G02B 27/02* (2006.01)
*G06T 19/00* (2011.01)

(52) U.S. Cl.
CPC ..... *G02B 27/0172* (2013.01); *G02B 27/0149* (2013.01); *G02B 27/0176* (2013.01); *G02B 27/028* (2013.01); *G06T 19/006* (2013.01); *G02B 2027/0132* (2013.01); *G02B 2027/0163* (2013.01)

(58) Field of Classification Search
CPC ............ G02B 27/0172; G02B 27/0149; G02B 27/028; G02B 27/0176; G02B 27/0093; G02B 2027/0163; G02B 2027/0132; G02B 2027/0187; G06F 3/013; G06F 3/011; G06T 19/006
See application file for complete search history.

(56) References Cited

U.S. PATENT DOCUMENTS

| | | | |
|---|---|---|---|
| 2010/0295769 A1* | 11/2010 | Lundstrom | G06F 3/013 345/156 |
| 2014/0256438 A1* | 9/2014 | Grant | G06F 3/013 463/36 |
| 2016/0342206 A1* | 11/2016 | Shazly | G06F 3/017 |
| 2018/0046147 A1* | 2/2018 | Aghara | A61B 5/6803 |
| 2018/0364491 A1* | 12/2018 | Park | G06F 3/011 |
| 2019/0005216 A1* | 1/2019 | Yakishyn | G01N 3/08 |
| 2019/0227329 A1* | 7/2019 | Han | G02B 27/0172 |
| 2019/0324280 A1* | 10/2019 | Yildiz | A61B 5/6831 |

* cited by examiner

*Primary Examiner* — Brent D Castiaux
(74) *Attorney, Agent, or Firm* — Lee, Hong, Degerman, Kang & Waimey

(57) ABSTRACT

Provided is an electronic device. The electronic device according to the present disclosure can adjust the length of a band surrounding a user's head, by sensing pressure of a part of the electronic device coming into contact with the user. Furthermore, the electronic device according to the invention can identify a direction in which the user's eyeball looks, and deduce the user's facial expression, by sensing the movement of muscle around the user's eyeball. The electronic device of the invention can be associated with artificial intelligence modules, robots, augmented reality (AR) devices, virtual reality (VR) devices, devices related to 5G service, etc.

15 Claims, 36 Drawing Sheets

| sensor | Time1 | Time2 | Time3 | Time N |
|--------|-------|-------|-------|--------|
| S 1 | 3 | 3 | 0 | |
| S 2 | 1 | e1 1 | 1 | |
| S 3 | 3 | 3 | 1 | |
| ⋮ | 0 | 0 e2 | 0 | |
| S 6 | 0 | 0 | 4 | |
| S 7 | 0 | 1 | 3 | |
| S 8 | 0 | 0 | 4 | |

(a)

C1    C2

(c)

C1    C2

(b)

C1    C2

(d)

C1    C2

ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2019-0107759, filed on Aug. 30, 2019, the contents of which are hereby incorporated by reference herein in its entirety.

BACKGROUND OF THE INVENTION

Field of the Invention

The present disclosure relates to an electronic device. More particularly, the invention relates to an electronic device, which is used for Virtual Reality (VR), Augmented Reality (AR), Mixed Reality (MR), etc.

Related Art

Virtual Reality (VR) refers to a certain environment, situation or technology itself which is produced by artificial technology using a computer or the like, is similar to reality but is not real.

Augmented Reality (AR) refers to technology that combines a virtual object or information with a real environment so that it seems to be an object existing in an original environment.

Mixed Reality (MR) or Hybrid Reality refers to technology that combines a virtual world and a real world to create a new environment or new information. Particularly, when a thing existing in real world and a thing existing in virtual world in real time may interact with each other in real time, this is referred to as mixed reality.

In this regard, the created virtual environment or situation excites a user's senses and allows the user to have spatial and temporal experience similar to the reality, thus allowing the user to freely move between reality and imagination. Furthermore, the user cannot only be immersed in such an environment, but also can interact with ones realized in this environment through manipulation or command using a real device.

Recently, research on a gear used in this technical field is actively conducted.

However, when a user wears a head mounted display (HMD) used in the AR or the VR and manipulates a cursor on a virtual screen displayed on the HMD, he or she should manipulate the cursor using a separate controller, thus causing inconvenience.

Furthermore, when a user uses the separate controller so as to manipulate the cursor, the user should directly use the controller with the controller in his or her hands, so that it is difficult to manipulate a band for fixing the HMD to the user's head.

SUMMARY OF THE INVENTION

The present disclosure provides an electronic device, which can measure the pressure of a part where an electronic device used for Virtual Reality (VR), Augmented Reality (AR), Mixed Reality (MR), etc. is in contact with a user's face, and can adjust the length of a band for fixing the electronic device to the user's head.

The present disclosure also provides an electronic device, in which the electronic device used for VR, AR, MR, etc. checks the movement of a user's eyeball, and a displayed cursor is also moved depending on the eyeball movement.

In an aspect, an electronic device worn on a user's head includes a display unit configured to display a virtual image or picture in front of the user's eyes, and a band coupled with the display unit to surround the user's head, wherein the display unit further includes a face contact unit coming into contact with the user's face, a sensing unit configured to sense whether the face comes into contact with the face contact unit, and an adjusting unit configured to adjust a length of the band, wherein the adjusting unit adjusts the length of the band using data sensed by the sensing unit.

The face contact unit may further include a face pad.

The sensing unit may include a plurality of sensors, and the sensors may be arranged inside the face pad to be spaced apart from each other at regular intervals.

The plurality of sensors may include at least first to eighth sensors.

The plurality of sensors may include at least one of a pressure sensor and an atmospheric pressure sensor.

The electronic device may further include a control unit configured to control and process a signal, data and information inputted into or outputted from the electronic device, wherein the sensing unit may be electronically connected to the control unit to transmit or receive the data to or from the control unit.

The adjusting unit may include a first shaft and a second shaft rotatable in a first direction and a second direction, a first motor and a second motor configured to rotate the first shaft and the second shaft in the first direction, and a first stopper and a second stopper configured to stop rotary movement of the first shaft and the second shaft, wherein the first shaft, the first motor and the first stopper may be arranged to correspond to a left side of the user's head, and the second shaft, the second motor and the second stopper are arranged to correspond to a right side of the user's head, and the first shaft, the first motor and the first stopper may be arranged to be symmetrical with the second shaft, the second motor and the second stopper.

The band may further include a first clip and a second clip mounted on opposite ends of the band, respectively.

The electronic device may further include a first wire connecting the first clip with the first shaft, and a second wire connecting the second clip with the second shaft, wherein the first wire may be wound around the first shaft, when the first shaft rotates in the first direction, and the second wire may be wound around the second shaft, when the second shaft rotates in the second direction.

The electronic device may further include a first spring configured to rotate the first shaft in the second direction, and a second spring configured to rotate the second shaft in the first direction.

Each of the first spring and the second spring may be a torsion spring.

The first shaft and the second shaft may further include a first gear and a second gear, respectively, the first stopper and the second stopper may further include a first hook and a second hook, respectively, the first gear and the second gear may be disposed on an upper portion of the first shaft and an upper portion of the second shaft, respectively, the first hook and the second hook may be disposed on a first end of the first gear and a first end of the second gear, respectively, and the first hook and the second hook may be detachably fastened to the first gear and the second gear, respectively.

The first stopper and the second stopper may further include a first protrusion and a second protrusion, respectively, and may further include a third motor and a fourth motor connected to the first protrusion and the second protrusion, respectively, and the third motor and the fourth motor may press the first protrusion and the second protrusion, respectively, in a predetermined direction.

The first stopper and the second stopper may further include a third spring and a fourth spring, respectively, and the third spring and the fourth spring may be coupled to a second end of the first stopper and a second end of the second stopper, respectively, to elastically support the first stopper and the second stopper.

Each of the third spring and the fourth spring may be a tension spring.

In another aspect, a method of adjusting a length of a band for fixing an electronic device to a user's head includes primarily sensing a pressure or atmospheric pressure value generated between a face contact unit through which the electronic device comes into contact with the user's face and the user's face, determining whether the primarily sensed pressure or atmospheric pressure value exceeds a threshold value, determining that the user wears the electronic device on his or her head if the primarily sensed pressure or atmospheric pressure value exceeds the threshold value, and primarily adjusting the length of the band.

In a further aspect, a method of determining a movement of an eyeball of a user wearing an electronic device on the head includes primarily sensing movement of a plurality of muscles connected with the eyeball, combining measured values detected by respective sensors at the primarily sensing, determining the movement of the eyeball, and moving a cursor on a display unit in response to the movement of the eyeball.

BRIEF DESCRIPTION OF THE DRAWINGS

FIG. 31 is a diagram illustrating measured values detected by the sensors, when the eyeball is moved in the direction of arrow e2 shown in FIG. 29.

DESCRIPTION OF EXEMPLARY EMBODIMENTS

Figure 1:
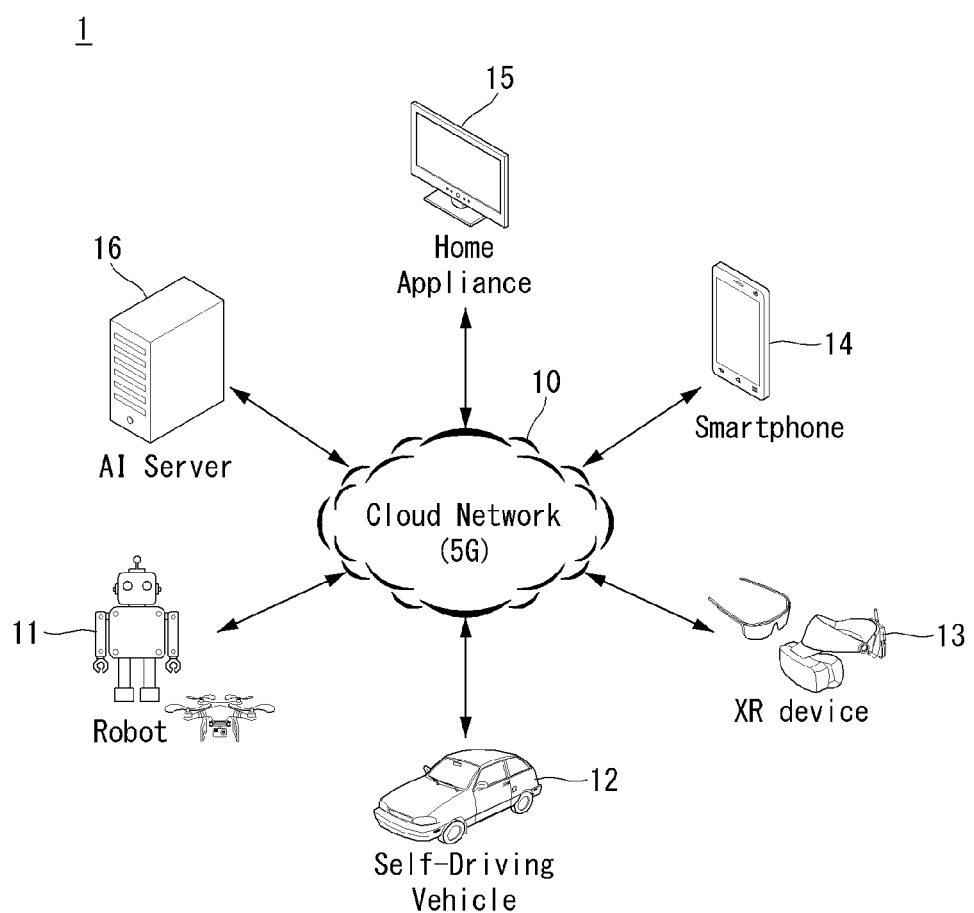
FIG. 1 is a conceptual diagram illustrating an embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

5G Scenario

The three main requirement areas in the 5G system are (1) enhanced Mobile Broadband (eMBB) area, (2) massive Machine Type Communication (mMTC) area, and (3) Ultra-Reliable and Low Latency Communication (URLLC) area. Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

AI+Robot

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

AI+Autonomous Navigation

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

AI+XR

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

AI+Robot+Autonomous Navigation

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

AI+Robot+XR

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

AI+Autonomous Navigation+XR

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

Extended Reality Technology eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present disclosure will be described.

Figure 2:
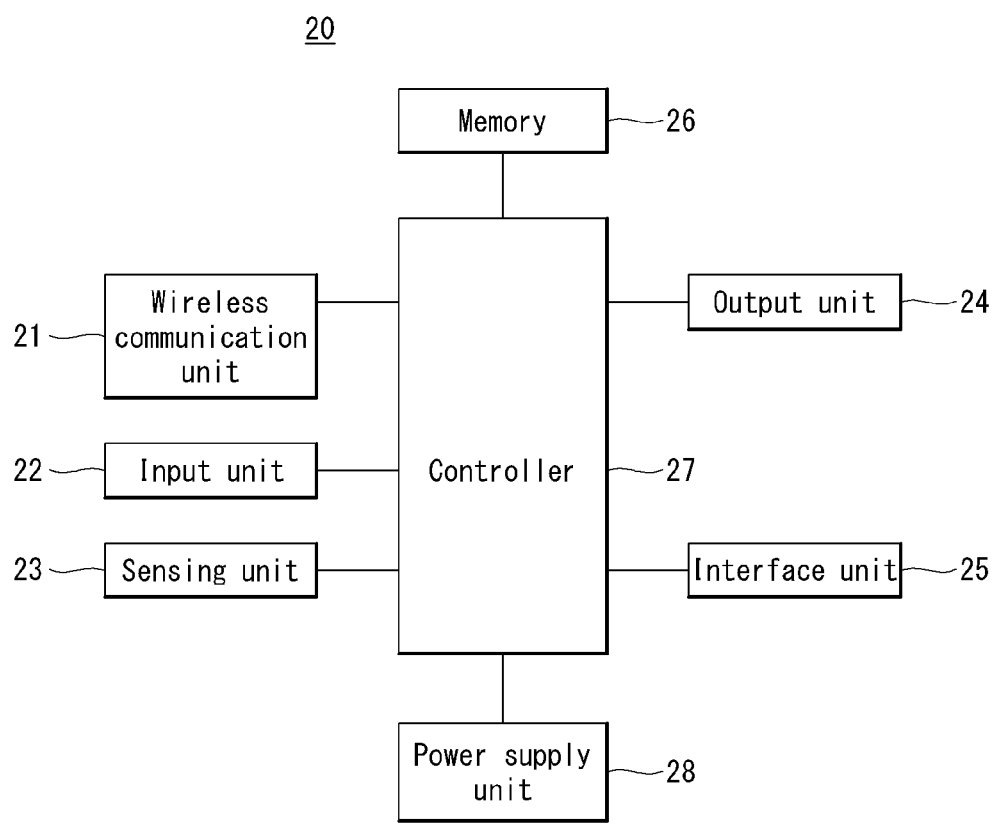
FIG. 2 is a block diagram illustrating the configuration of an extended reality electronic device according to an embodiment of the present disclosure.

FIG. 2 is a block diagram illustrating the structure of an XR electronic device 20 according to one embodiment of the present disclosure.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present disclosure will be described with reference to an example where the electronic device is applied to a Head Mounted Display (HMD). However, embodiments of the electronic device according to the present disclosure may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
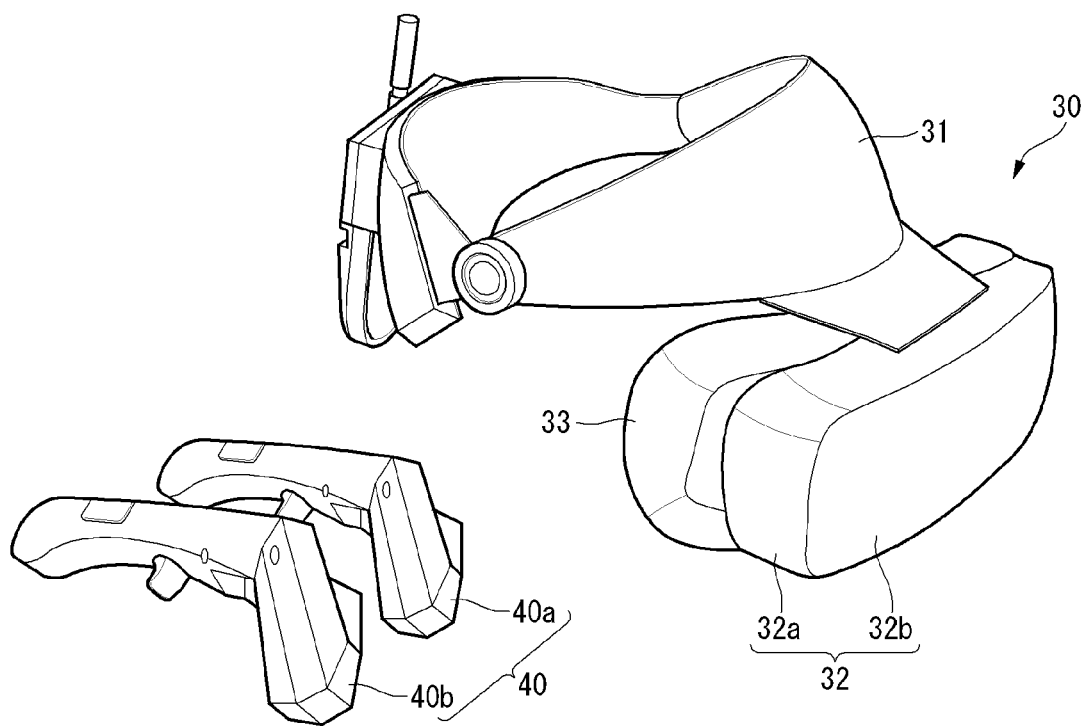
FIG. 3 is a perspective view of a virtual reality electronic device according to an embodiment of the present disclosure.
Figure 4:
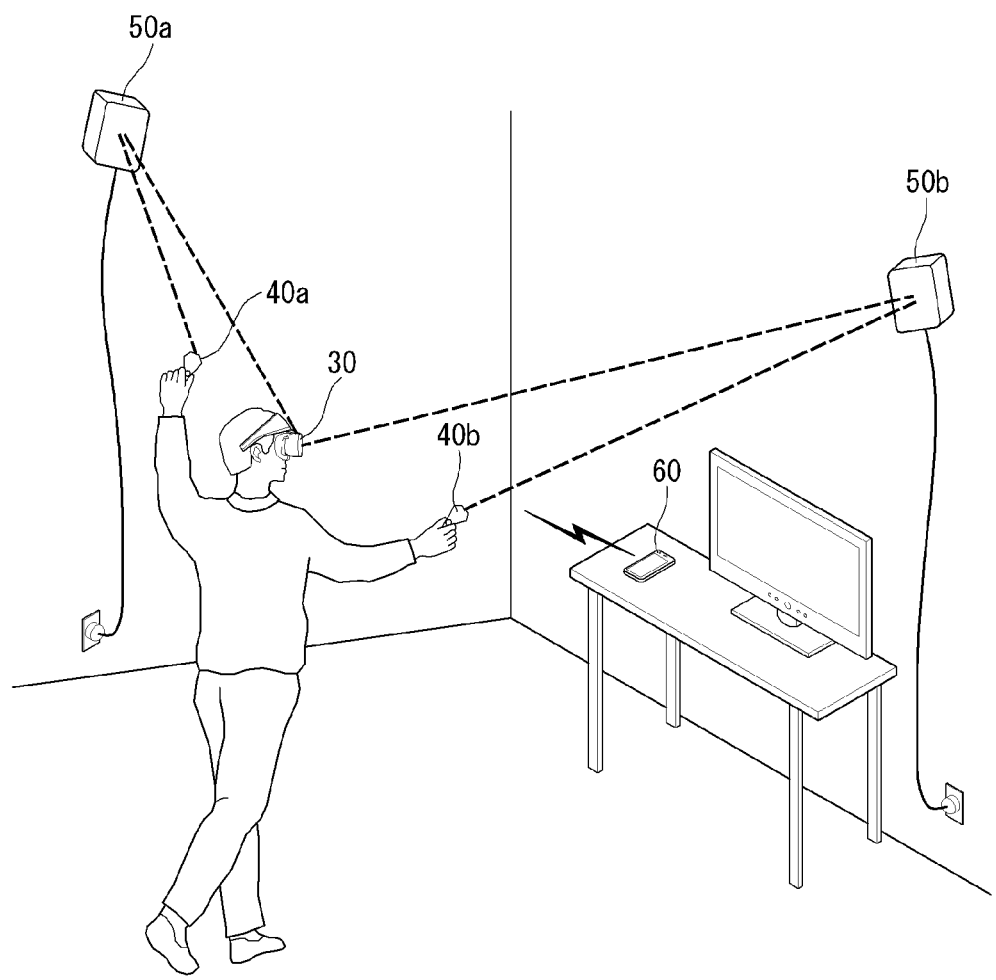
FIG. 4 is a diagram illustrating a state where the virtual reality electronic device of FIG. 3 is used.

FIG. 3 is a perspective view of a VR electronic device according to one embodiment of the present disclosure, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present disclosure. For example, an input device installed in the electronic device 30 may replace the controller 40, and position information may be determined by itself from various sensors installed in the electronic device 30.

Figure 5:
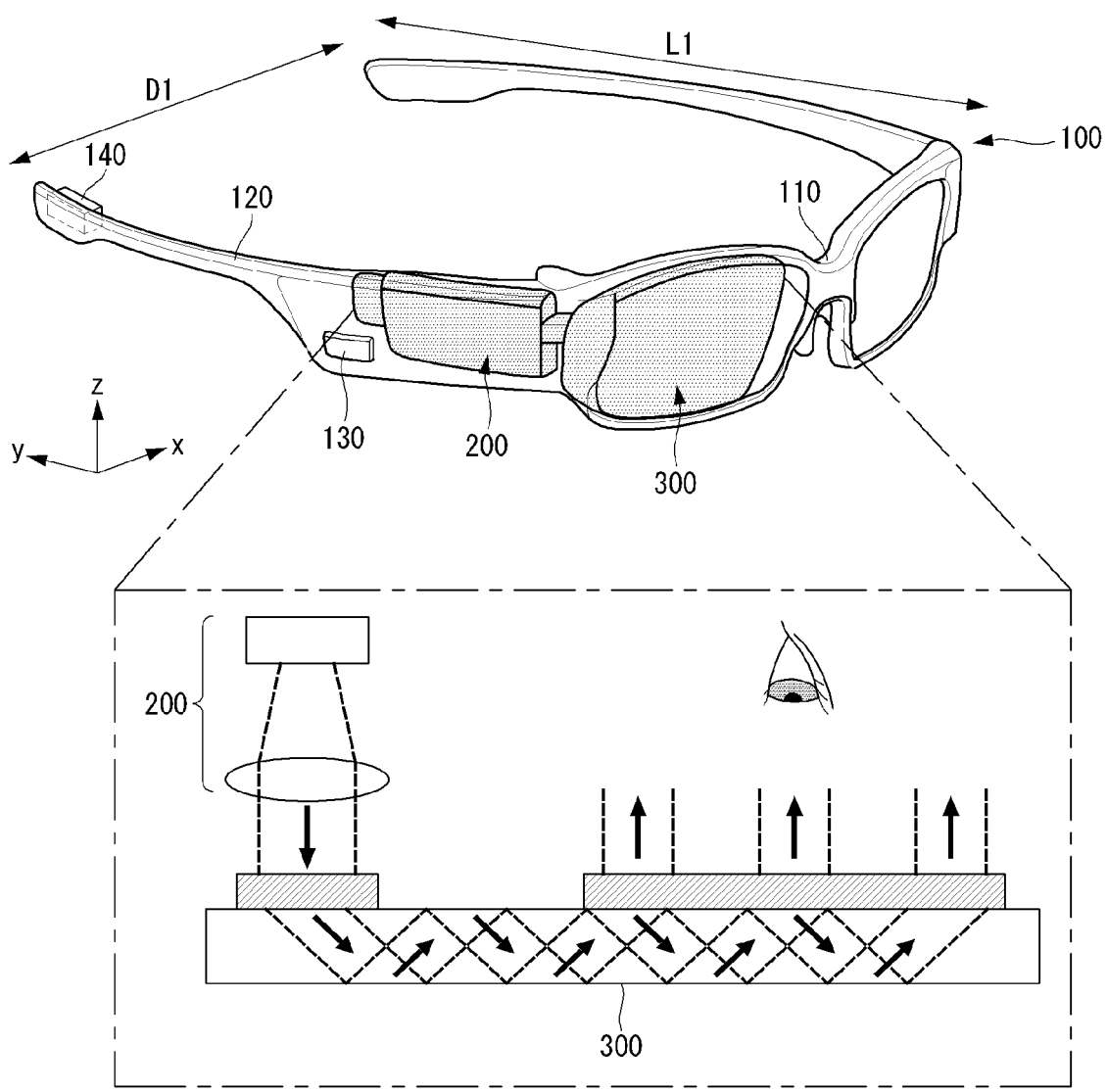
FIG. 5 is a perspective view of an augmented reality electronic device according to an embodiment of the present disclosure.

FIG. 5 is a perspective view of an AR electronic device according to one embodiment of the present disclosure.

As shown in FIG. 5, the electronic device according to one embodiment of the present disclosure may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present disclosure is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

Figure 6:
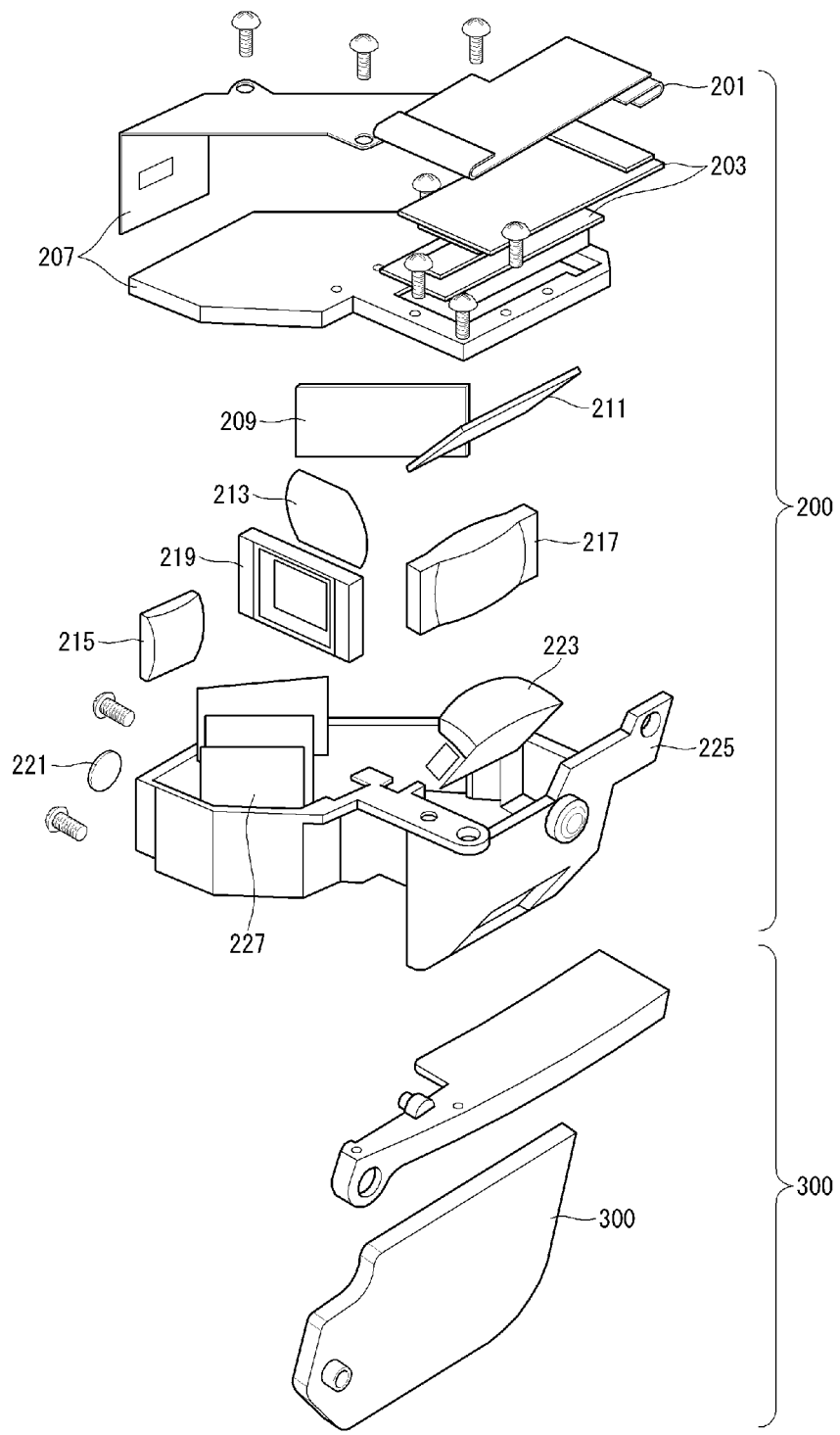
FIG. 6 is an exploded perspective view illustrating a control unit according to an embodiment of the present disclosure.

FIG. 6 is an exploded perspective view of a controller according to one embodiment of the present disclosure.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7 to 13 illustrate various display methods applicable to the display unit 300 according to one embodiment of the present disclosure.

Figure 7:
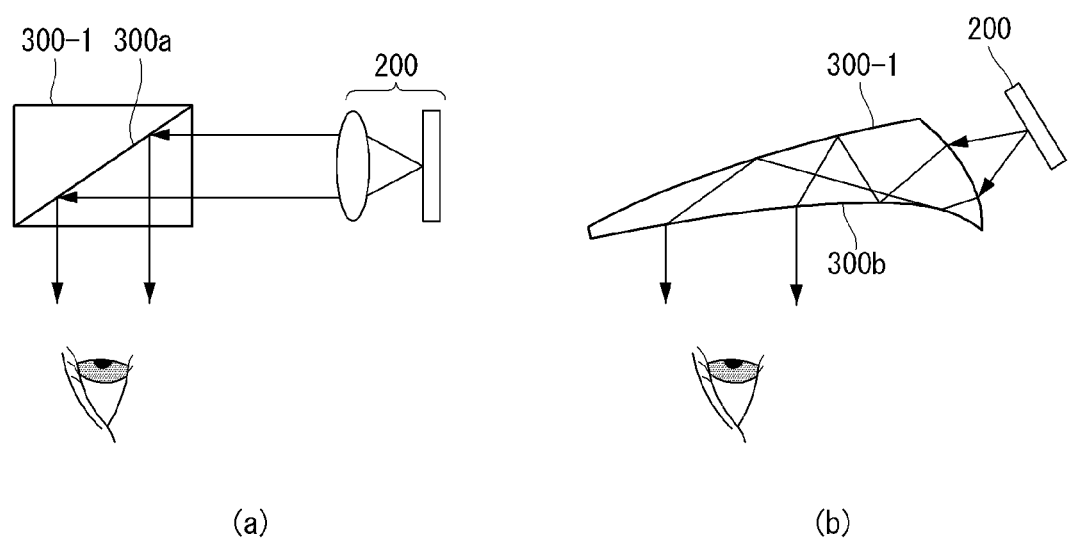
FIGS. 7 to 13 are conceptual diagrams illustrating various display methods applicable to a display unit according to an embodiment of the present disclosure.
Figure 8:
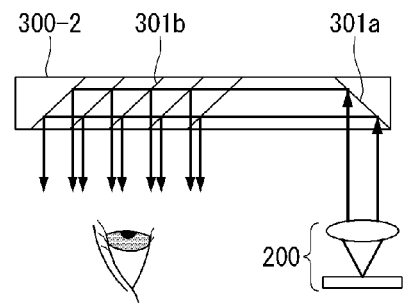
Figure 8:
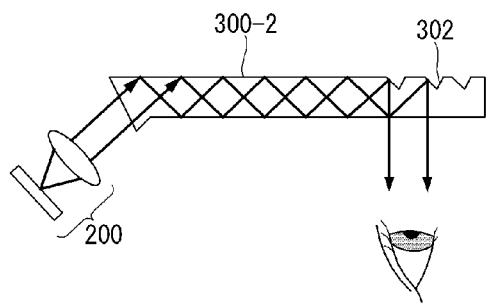
Figure 8:
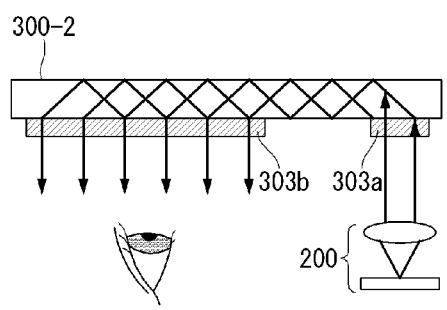
Figure 8:
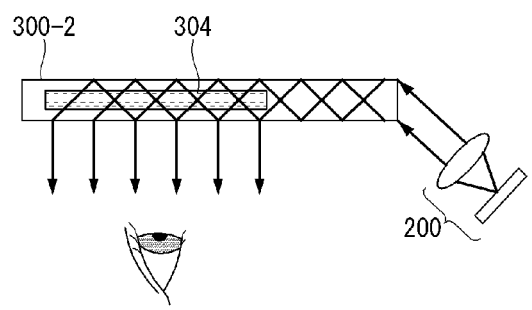
Figure 8:
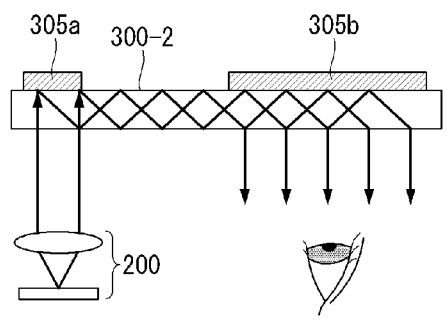
Figure 8:
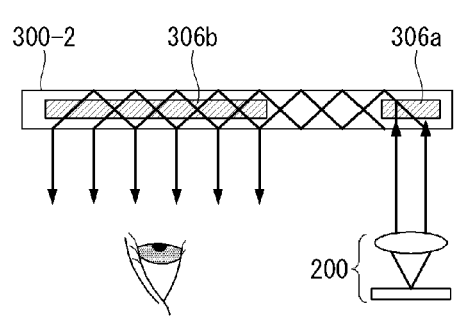
Figure 9:
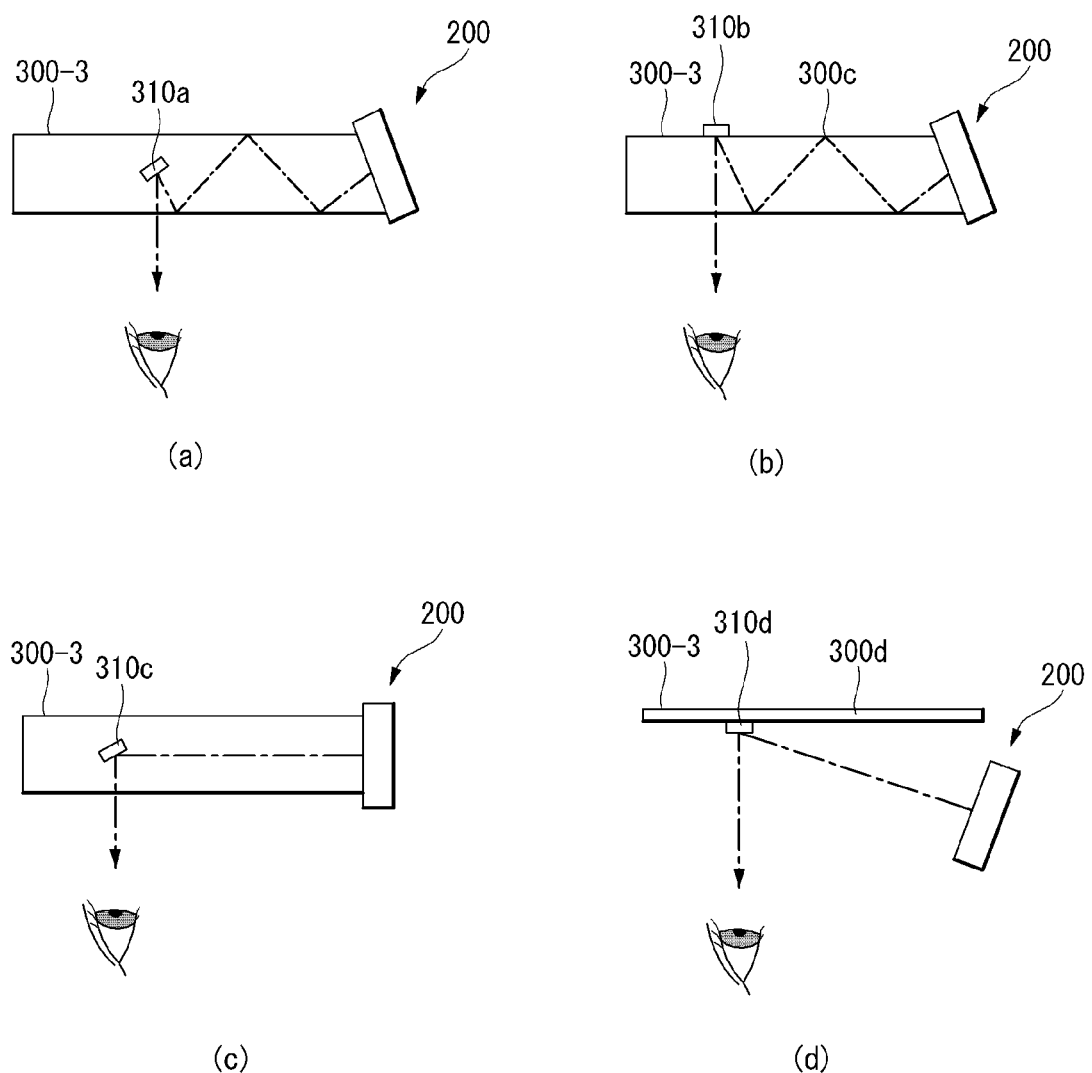
Figure 10:
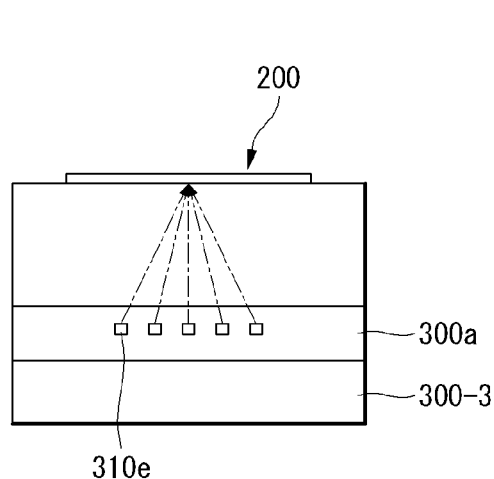
Figure 10:
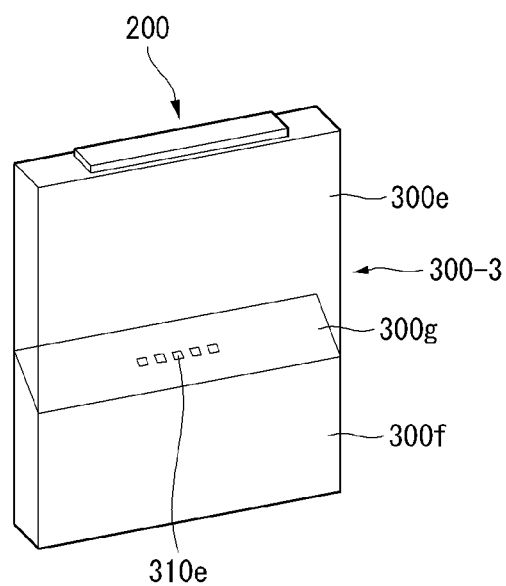
Figure 10:
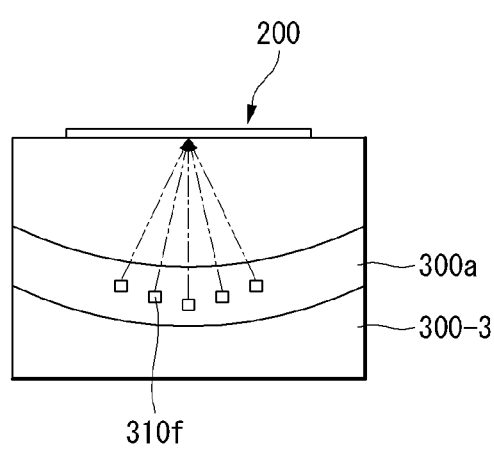
Figure 10:
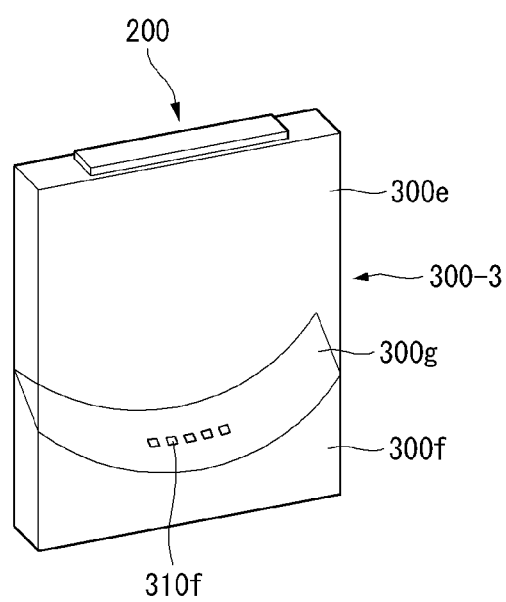
Figure 11:
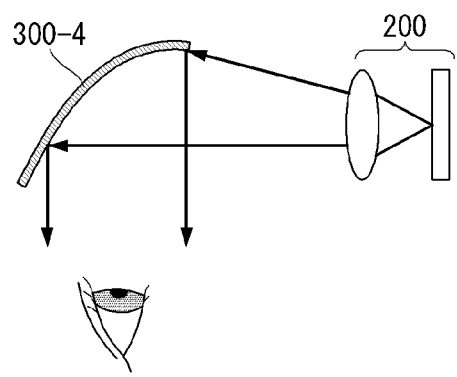
Figure 11:
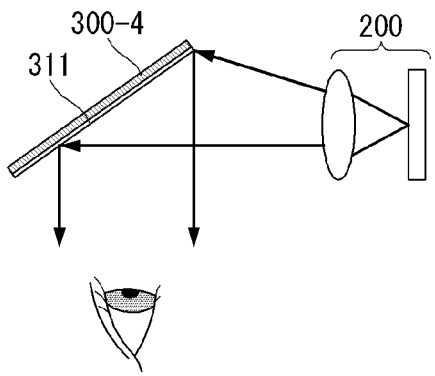
Figure 11:
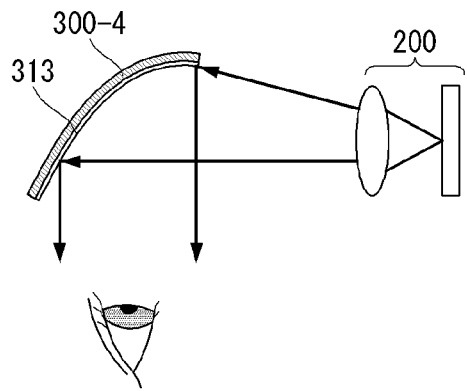
Figure 12:
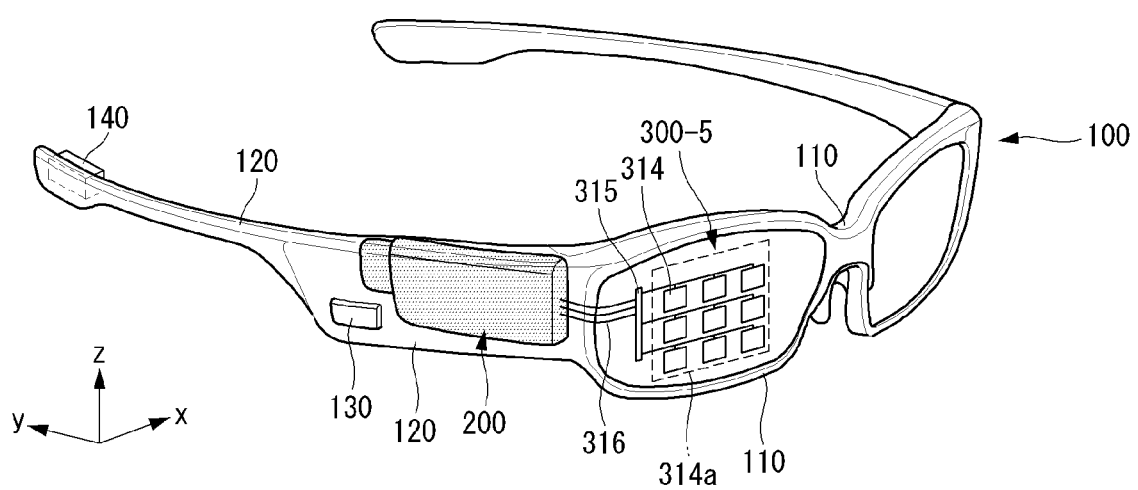
Figure 13:
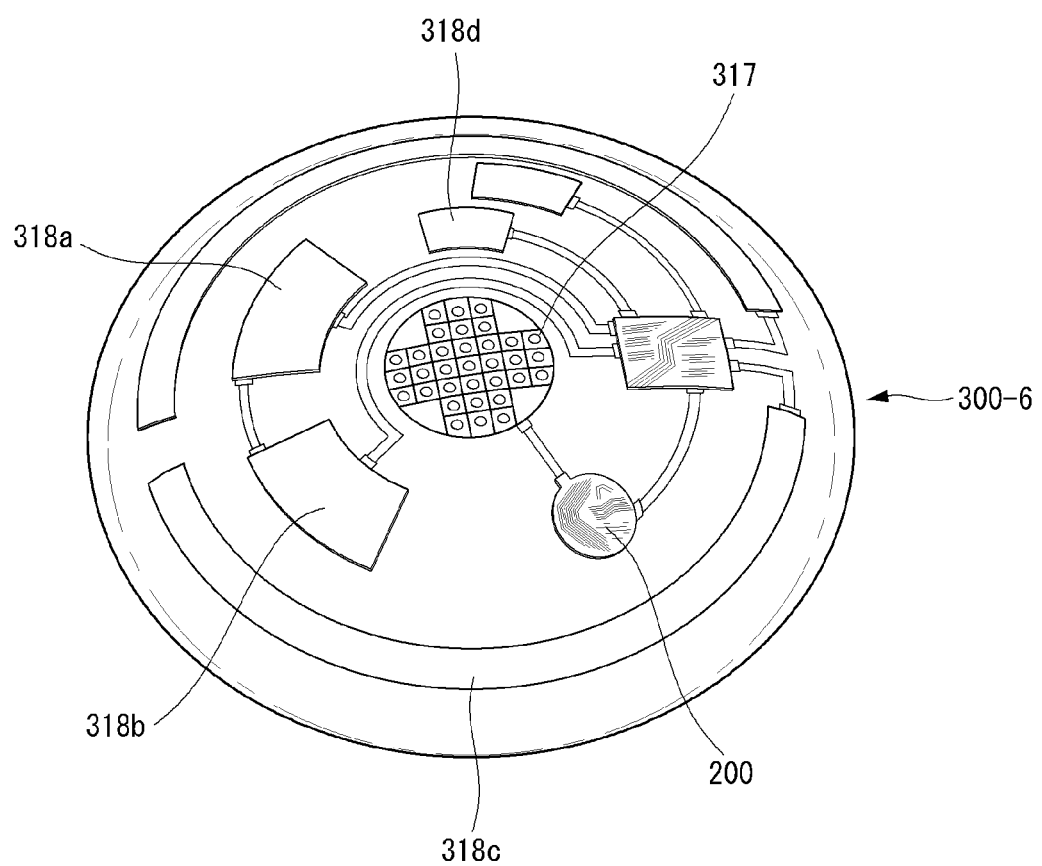

More specifically, FIG. 7 illustrates one embodiment of a prism-type optical element; FIG. 8 illustrates one embodiment of a waveguide-type optical element; FIGS. 9 and 10 illustrate one embodiment of a pin mirror-type optical element; and FIG. 11 illustrates one embodiment of a surface reflection-type optical element. And FIG. 12 illustrates one embodiment of a micro-LED type optical element, and FIG. 13 illustrates one embodiment of a display unit used for contact lenses.

As shown in FIG. 7, the display unit 300-1 according to one embodiment of the present disclosure may use a prism-type optical element.

In one embodiment, as shown in FIG. 7(a), a prism-type optical element may use a flat-type glass optical element where the surface 300a on which image light rays are incident and from which the image light rays are emitted is planar or as shown in FIG. 7(b), may use a freeform glass optical element where the surface 300b from which the image light rays are emitted is formed by a curved surface without a fixed radius of curvature.

The flat-type glass optical element may receive the image light generated by the controller 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 8, the display unit 300-2 according to another embodiment of the present disclosure may use a waveguide-type optical element or light guide optical element (LOE).

As one embodiment, the waveguide or light guide-type optical element may be implemented by using a segmented beam splitter-type glass optical element as shown in FIG. 8(a), saw tooth prism-type glass optical element as shown in FIG. 8(b), glass optical element having a diffractive optical element (DOE) as shown in FIG. 8(c), glass optical element having a hologram optical element (HOE) as shown in FIG. 8(d), glass optical element having a passive grating as shown in FIG. 8(e), and glass optical element having an active grating as shown in FIG. 8(f).

As shown in FIG. 8(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 8(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present disclosure may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9 and 10.

Referring to FIG. 9(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 9(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 9(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 9(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 10 illustrates the shape of a pinhole mirror and structure of an array pattern according to one embodiment of the present disclosure.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 10(a) and (b) illustrate the Flat Pin Mirror scheme, and FIGS. 10(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 10(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present disclosure may employ the freeform combiner method as shown in FIG. 11(a), Flat HOE method as shown in FIG. 11(b), and freeform HOE method as shown in FIG. 11(c).

The surface reflection-type optical element based on the freeform combiner method as shown in FIG. 11(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 11(c) may have a HOE 313 coated or patterned on the surface of freeform glass, where the operating principles may be the same as described with reference to FIG. 11(b).

In addition, a display unit 300-5 employing micro LED as shown in FIG. 12 and a display unit 300-6 employing a contact lens as shown in FIG. 13 may also be used.

Referring to FIG. 12, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present disclosure may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present disclosure may include a retina scan method.

Hereinafter, the electronic device according to the present disclosure may be implemented similarly or identically to the electronic device 30 used for the virtual reality (VR) experience shown in FIG. 3. Therefore, the electronic apparatus according to the present disclosure may also be referred to as an electronic device, and terms of the electronic device and the electronic device may be interchangeably used. Furthermore, the electronic apparatus according to the present disclosure may be described using the same reference numerals and terms as the electronic device 30 shown in FIG. 3. Furthermore, in order to avoid a duplicated description, reference may be made to the description of components of the electronic device 30 shown in FIG. 3.

Figure 14:
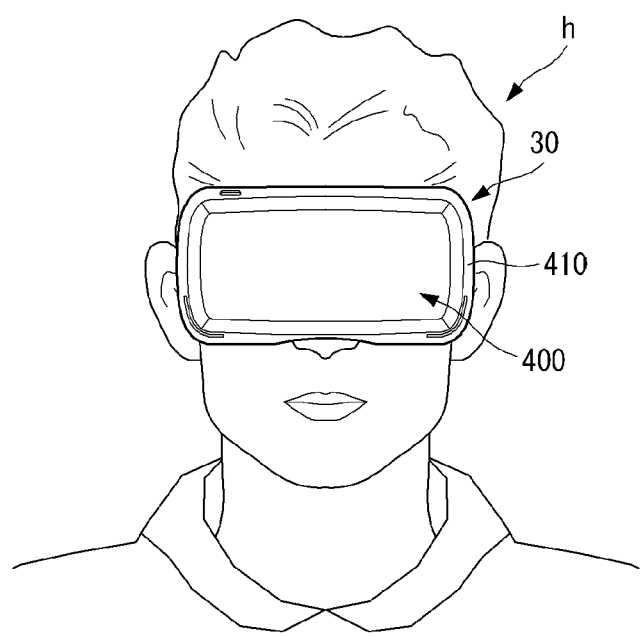
FIG. 14 is a front view illustrating a state where a user wears the electronic device according to the present disclosure.
Figure 15:
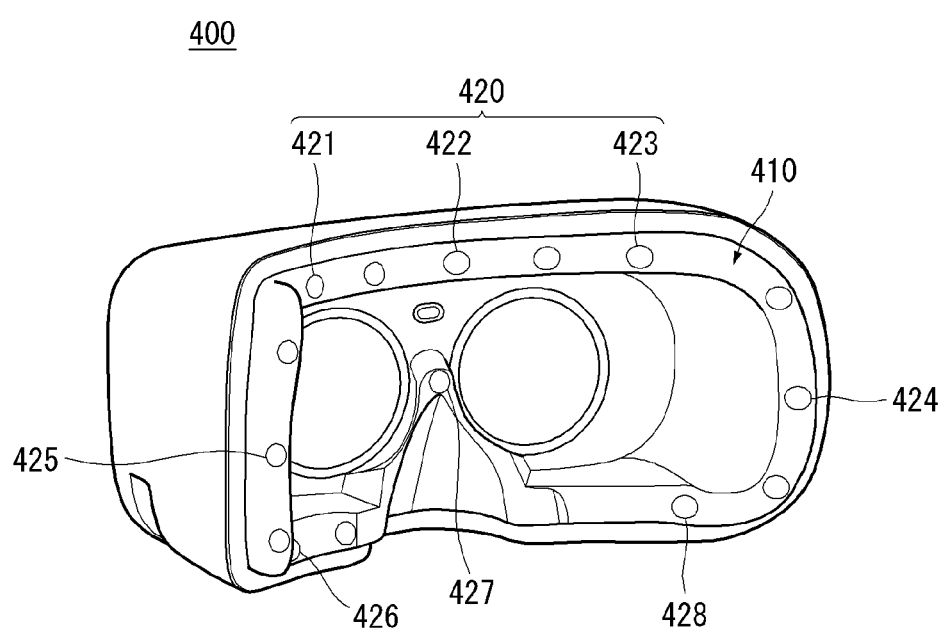
FIG. 15 is a perspective view of the electronic device according to the present disclosure.
Figure 16:
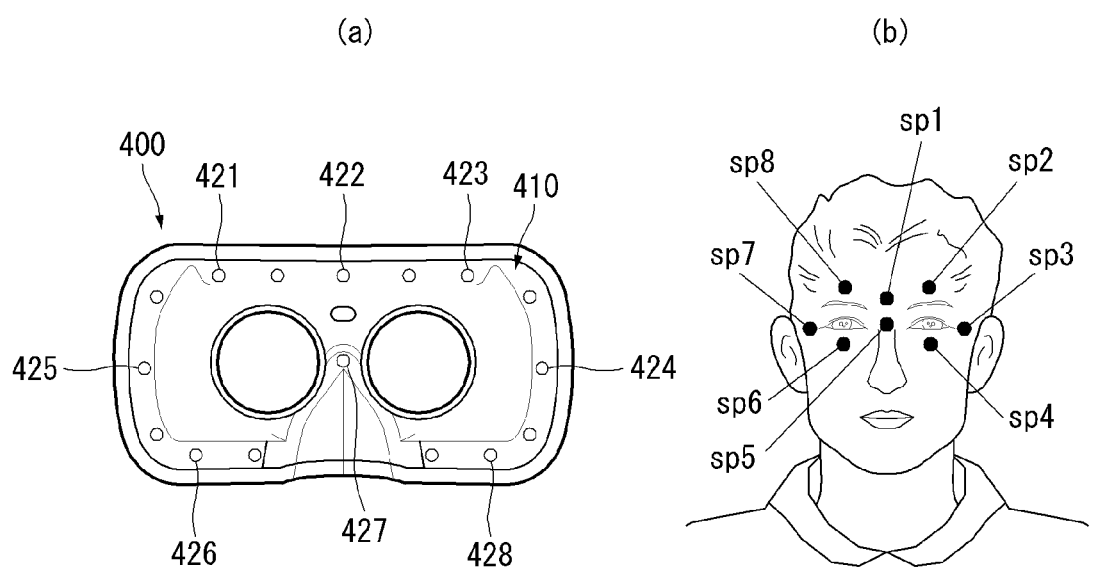
FIG. 16 is a rear view of the electronic device for illustrating a sensing unit according to the present disclosure.
Figure 18:
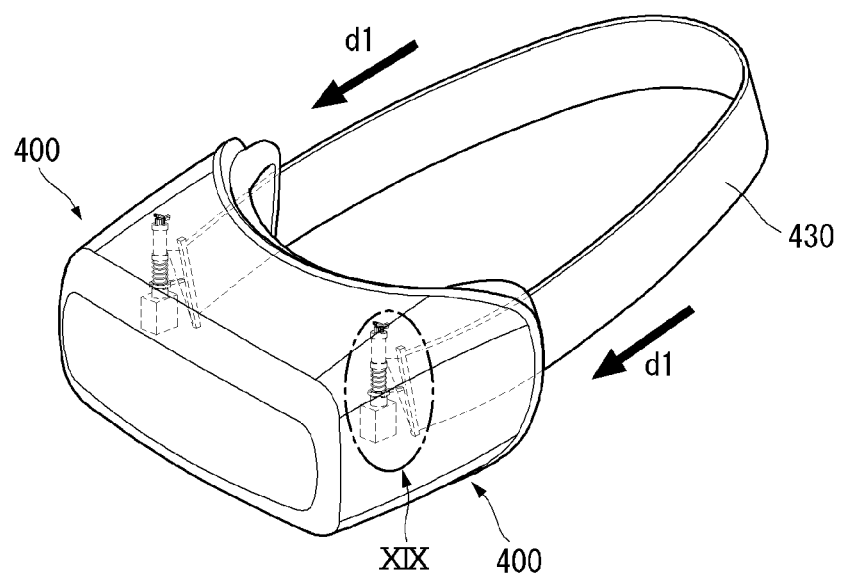
Figure 19:
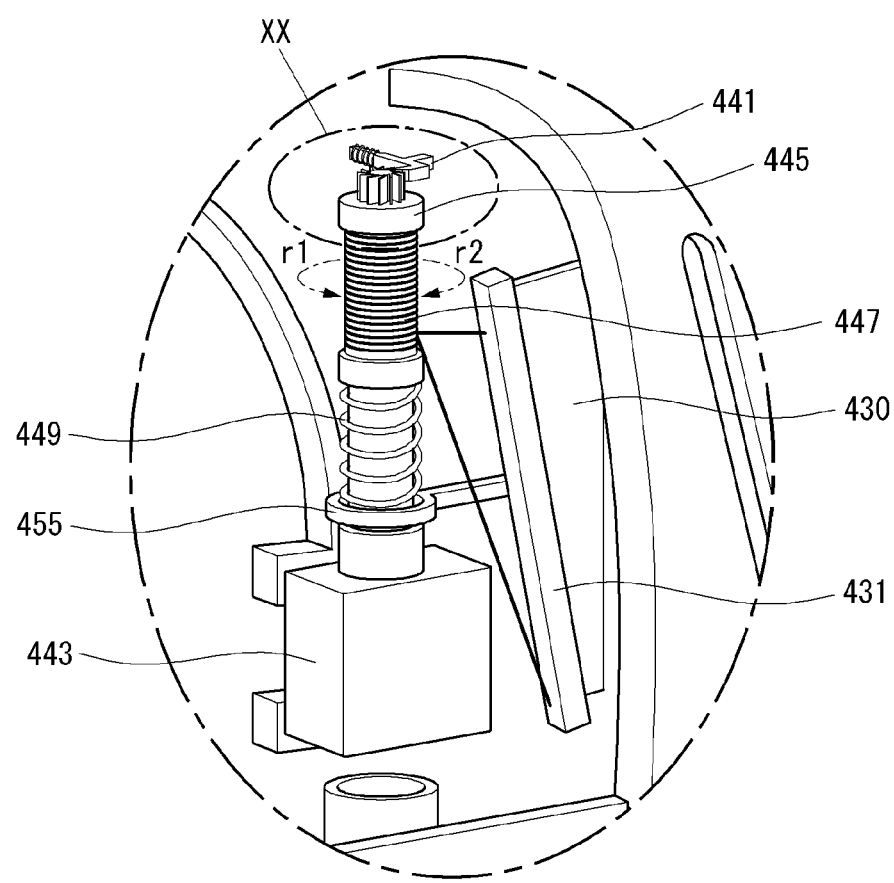
FIGS. 19 and 20 are diagrams illustrating the configuration of an adjusting unit according to the present disclosure.
Figure 20:
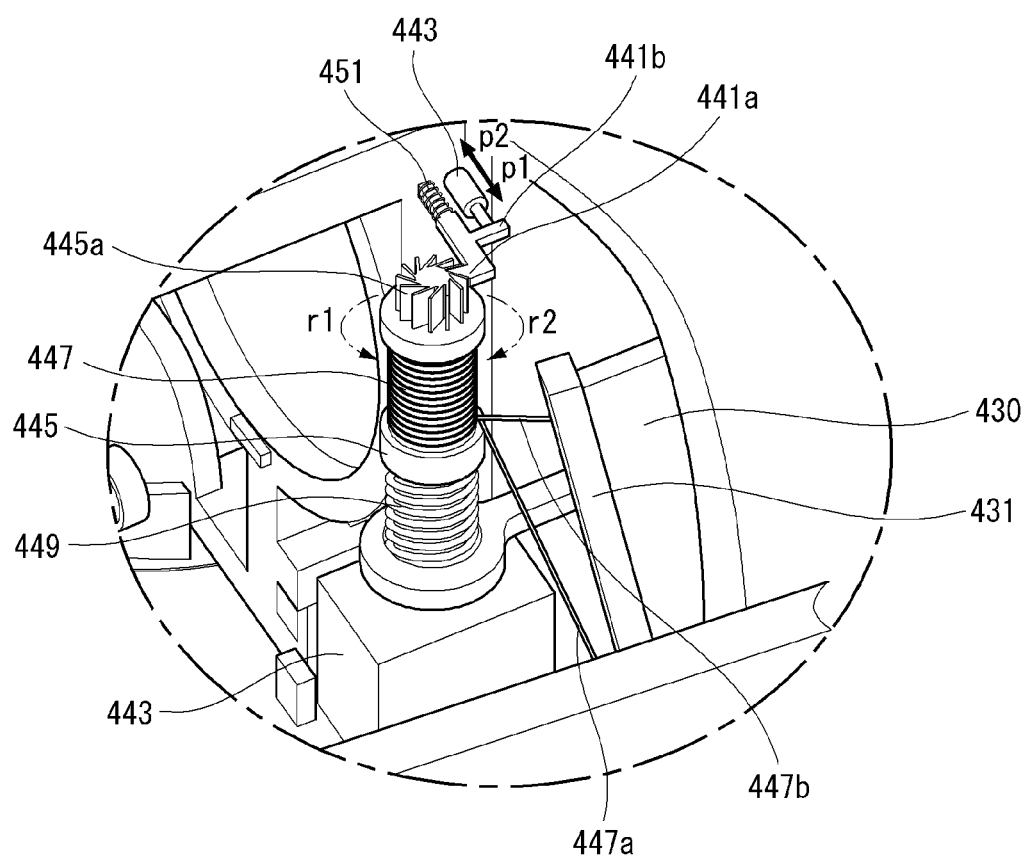

The electronic device according to the present disclosure will be described in detail with reference to FIGS. 14 to 20. FIG. 14 is a front view illustrating a state where a user wears the electronic device according to the present disclosure, FIG. 15 is a perspective view of the electronic device according to the present disclosure, and FIG. 16 is a rear view of the electronic device for illustrating a sensing unit according to the present disclosure. Furthermore, FIGS. 17 and 18 are diagrams illustrating a process of adjusting the length of a band by the electronic device according to the present disclosure, and FIGS. 19 and 20 are diagrams illustrating the configuration of an adjusting unit according to the present disclosure.

Figure 17:
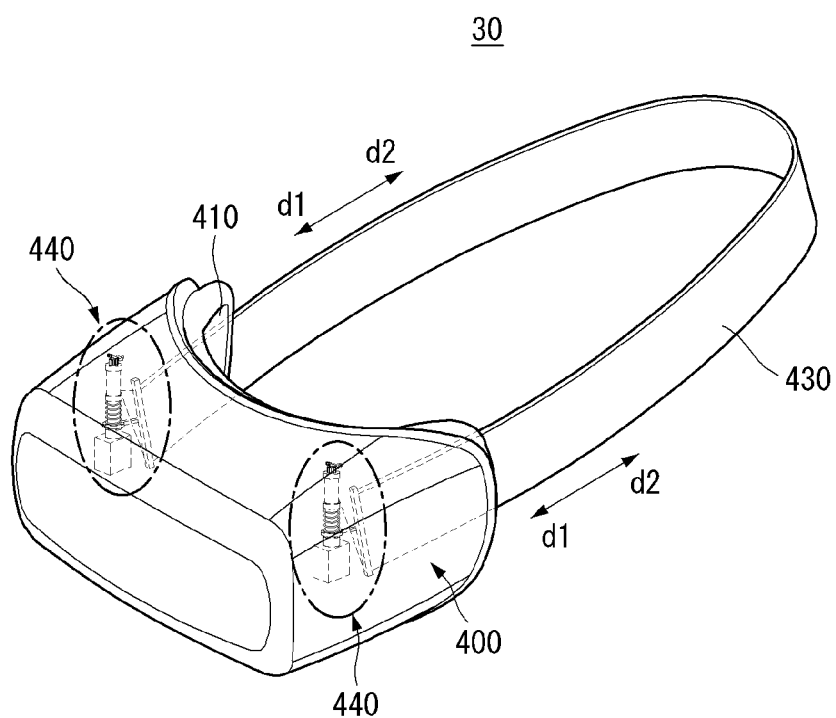
FIGS. 17 and 18 are diagrams illustrating a process where the electronic device according to the present disclosure adjusts the length of a band.

Referring to FIGS. 14 and 17, the electronic device 30 according to the present disclosure includes a display unit 400 and a band 410.

As described above, the display unit 400 displays a virtual image or picture in front of the user's eyes, and the band 430 is coupled with the display unit 400 to surround a user's head h, and fixes the display unit 400 to the user's head h.

Referring to FIGS. 15 and 16, the display unit 400 includes a face contact unit 410, a sensing unit 420, and an adjusting unit 440. The face contact unit 410 is a part coming into contact with a user's face, and further includes a face pad. Therefore, the face contact unit 410 may be referred to as the face pad 410.

As illustrated in FIG. 16, the sensing unit 420 includes a plurality of sensors 421, 422, 423, 424, 425, 426, 427 and 428 to sense whether the user's face comes into contact with the face contact unit 410. The plurality of sensors includes at least first to eighth sensors 421, 422, 423, 424, 425, 426, 427 and 428. However, the sensing unit 420 may include sensors more than the first to eighth sensors 421, 422, 423, 424, 425, 426, 427 and 428, as described above and illustrated in FIG. 16. That is, the sensing unit 420 may include N sensors 421, 422, 423, 424, 425, 426, 427, 428, . . . N to sense whether the user's face comes into contact with the face contact unit 410 and to sense the movement of muscle around the eyeball, which will be described later.

For the convenience of description, in some embodiments, an example wherein the sensing unit 420 of the electronic device 30 includes the first to eighth sensors 421, 422, 423, 424, 425, 426, 427 and 428 will be described.

Referring to FIGS. 15 and 16A, the first to eighth sensors 421, 422, 423, 424, 425, 426, 427 and 428 are arranged at regular intervals inside the face contact unit 410, namely, the face pad 410.

Particularly, referring to FIG. 16B, the first to eighth sensors 421, 422, 423, 424, 425, 426, 427 and 428 and more sensors other than these sensors are arranged at regular intervals inside the face pad 410. The first to eighth sensors 421, 422, 423, 424, 425, 426, 427 and 428 and more sensors come into contact with a plurality of sensing spots SP1, SP2, SP3, SP4, SP5, SP6, SP7 and SP8 around a user's both eyes, thus sensing whether the face comes into contact with the face contact unit 410.

To this end, the plurality of sensors 421, 422, 423, 424, 425, 426, 427 and 428 are configured to include at least one of a pressure sensor and an atmospheric pressure sensor. That is, if the face pad 410 comes into contact with the user's face, the face pad 410 is pressed by the plurality of sensing spots SP1, SP2, SP3, SP4, SP5, SP6, SP7 and SP8 around both eyes. At this time, the first to eighth sensors 421, 422, 423, 424, 425, 426, 427 and 428 arranged inside the face pad 410 to correspond to the plurality of sensing spots SP1, SP2, SP3, SP4, SP5, SP6, SP7 and SP8 may sense a change in pressure acting on the face pad 410 or atmospheric pressure in the face pad 410.

Meanwhile, the adjusting unit 440 adjusts the length of the band 430, according to a change in pressure or atmospheric pressure sensed by the first to eighth sensors 421, 422, 423, 424, 425, 426, 427 and 428. Therefore, the adjusting unit 440 may include a processor included in a control unit 27, and a separate processor. The processor included in the adjusting unit 440 controls the operation of the adjusting unit 440 depending on the variance of pressure or atmospheric pressure sensed by the plurality of sensors 421, 422, 423, 424, 425, 426, 427 and 428. Furthermore, the processor included in the adjusting unit 440 may be operated in conjunction with the processor included in the control unit 27, and the processors may be configured to exchange data.

A method in which the adjusting unit 440 adjusts the length of the band 430 will be described with reference to FIGS. 17 and 18. First, in order for the user to wear the display unit 400 on his or her head, the band 430 is pulled to make a space for the head. In this case, the band 430 is loosened from the adjusting unit 440 in the direction d2.

As described above, if the user makes the display unit 400 come into contact with the user's face and makes the band 430 be worn on the head, the face pad 410 is pressed by the plurality of sensing spots SP1, SP2, SP3, SP4, SP5, SP6, SP7 and SP8 shown in FIG. 16B. At this time, the plurality of sensors 421, 422, 423, 424, 425, 426, 427 and 428 arranged in the face pad 410 measures a change in atmospheric pressure that occurs when the face pad 410 is pressed. Furthermore, the sensors 421, 422, 423, 424, 425, 426, 427 and 428 also measure pressure acting on the face pad 410 by bones forming the user's facial skeleton or the sensing spots SP1, SP2, SP3, SP4, SP5, SP6, SP7 and SP8.

The processor of the adjusting unit 440 determines whether a change value of the pressure or the atmospheric pressure exceeds a threshold value. If it is determined that the change value of the measured pressure or atmospheric pressure exceeds the threshold value, the processor determines that the display unit 400 is located at a proper position of the face and is ready to cover the user's eyeball. Thereafter, the processor controls the adjusting unit 440 so that the band 430 moves in the direction d1 and is tightly worn on the user's head.

The configuration of the adjusting unit 440 will be described in more detail with reference to FIGS. 19 and 20.

The adjusting unit 440 may be divided into a first adjusting part 440 disposed on the left side of the user's head and a second adjusting part 440 disposed on the right side of the head, so as to adjust the band 430 to be loose or taut. The first adjusting part 440 may include a first shaft 445, a first motor 443, and a first stopper 441, and the second adjusting part 440 may include a second shaft (not shown), a second motor (not shown), and a second stopper (not shown).

The first shaft 445 and the second shaft, the first motor 443 and the second motor, and the first stopper 441 and the second stopper are components that are disposed on the left and right sides of the user's head to be symmetrical with each other, and are the same components. Thus, as illustrated in FIGS. 19 and 20, the first shaft 445, the first motor 443, and the first stopper 441 included in the first adjusting part 440 will be described as an example.

As illustrated in FIG. 19, the first shaft 445 is configured to be rotatable in a first direction r1 and a second direction r2, and is connected at a lower part thereof to the first motor 443.

The first motor 443 rotates the first shaft 445 in the first direction r1 or the second direction r2. That is, the first motor 443 may rotate the first shaft 445 only in one direction, and may be a DC motor. Hereinafter, for the convenience of description, an example where the first motor is rotated in the first direction r1, and the second motor disposed to be symmetrical with the first motor is rotated in the second direction r2 will be described.

Meanwhile, the first stopper 441 is configured to prevent the first shaft 445 from being rotated in the first direction r1.

Here, the band 430 has a first clip 431 and a second clip (not shown) mounted on opposite ends thereof, and a first wire 447 and a second wire (not shown) are connected to the first clip 431 and the second clip, respectively. The first wire 447 connects the first clip 431 with the first shaft 445, and is wound around a body of the first shaft 445, when the first shaft 445 rotates in the first direction r1. Meanwhile, the second wire connects the second clip with the second shaft, and is wound around a body of the second shaft, when the second shaft rotates in the second direction r2.

Furthermore, a first spring 449 that may rotate the first shaft 445 in the second direction r2 is coupled with the first shaft 445, and a second spring that may rotate the second shaft in the first direction r1 is coupled with the second shaft. In this case, as illustrated in FIG. 19, the first spring 449 is preferably coupled to the first shaft 445 to be physically separated from the first wire 447 and the first motor 443. To this end, referring to FIG. 19, the first spring 449 may be physically separated from the first motor 443 by a first washer 455, and may be physically separated from the first wire 447 by a step formed on a central portion of the first shaft 445. As described above, the second spring may be physically separated from the second motor and the second wire by a step formed on the second washer and the center of the second shaft.

Each of the first spring 449 and the second spring may be a torsion spring to elastically support a rotating object. That is, if the first shaft 445 rotates in the first direction r1, the first spring 449 may rotate the first shaft 445 in the second direction r2 by elasticity, and the second spring (not shown) may rotate the second shaft rotating in the second direction in the first direction r1.

Meanwhile, the first shaft 445 may further include a first gear 445*a*, and the second shaft may further include a second gear (not shown). Here, the first gear 445*a* may be a ratchet gear that allows the first shaft 445 to be rotated in the first direction r1 and prevents it from being rotated in the second direction r2. Furthermore, the second gear may be a ratchet gear that allows the second shaft to be rotated in the second direction and prevents it from being rotated in the first direction r1.

Referring to FIG. 20, the first gear 445*a* may be the ratchet gear formed on the upper portion of the first shaft 445, and the second gear may also be configured in the same manner as the first gear 445*a*.

Furthermore, a first stopper 441 and a second stopper may further include a first hook 441*a* and a second hook (not shown), respectively. As illustrated in FIG. 20, the first hook 441*a* may be formed on one end of the first stopper 441, and the second hook may likewise be formed.

The first hook 441*a* may be detachably fastened to the first gear 445*a* to allow the first gear 445*a* to be rotated in the first direction r1 and prevent it from being rotated in the second direction r2. The same applies to the second hook. However, since the second hook is configured to be symmetrical with the first hook 441*a*, it allows the second gear to be rotated in the second direction r2 and prevents it from being rotated in the first direction r1.

To this end, an inclined surface is formed on a surface of the first hook 441*a* and is configured to slide relative to an inclined surface formed on a surface of the ratchet-gear-shaped first gear 445*a*. The second hook may also be configured identically to the first hook 441*a*.

Furthermore, the first stopper 441 and the second stopper may further include a first protrusion 441*b* and a second protrusion (not shown), respectively, and may further include a third motor 443 connected to the first protrusion 441*b* and a fourth motor (not shown) connected to the second protrusion.

Referring to FIG. 20, the third motor 443 is configured to press the first protrusion 441*b* in the direction p1. In this case, the third motor 443 is preferably composed of a linear motor. Likewise, the fourth motor is preferably configured to press the second protrusion in the direction p2. This is because the fourth motor and the second stopper are arranged to be symmetrical with the third motor 443 and the first stopper 441.

Furthermore, the first stopper 441 and the second stopper may further include a third spring 451 and a fourth spring (not shown), respectively. The third spring 451 is coupled to the other end of the first stopper 441, and the fourth spring is coupled to the other end of the second stopper.

Referring to FIG. 20, the third spring 451 elastically supports the first stopper 441 to move the first stopper 441 in the direction p2. To this end, the third spring 451 is preferably a tension spring.

Likewise, the fourth spring elastically supports the second stopper to move the second stopper in the direction p1, and the fourth spring is preferably the tension spring.

Referring to FIGS. 17 to 20, when one desires to loosen the band 430, the first adjusting part 440 causes the third motor 443 that is the linear motor to press the first protrusion 441*b* in the direction p1, and causes the first stopper 441 to be separated from the first gear 445*a*.

Here, since the first spring 449 is the torsion spring, the first shaft 445 is elastically supported in the second direction r2. While the first shaft 445 freed from the first stopper 441 is rotated in the second direction r2, the first wire 447 is unwound from the first shaft 445.

Meanwhile, while the first wire 447 is unwound from the first shaft 445, the first clip 431 and the band 430 are loosely unwound in the direction d2 from the display unit 400.

Subsequently, if the plurality of sensors 421, 422, 423, 424, 425, 426, 427 and 428 included in the sensing unit 420 sense a pressure value exceeding a threshold value and variance in atmospheric pressure, the adjusting unit 440 or the processor included in the adjusting unit 440 control the first motor 443 to adjust the length of the band 430 or to make the band 430 taut.

First, the adjusting unit 440 controls to rotate the first motor 443 in the first direction r1. Here, the first shaft 445 connected to the first motor 443 is rotated in the first direction r1, and the first wire 447 is wound around a body portion of the first shaft 445. Therefore, the first clip 431 connected to the first wire 447 is moved in the direction d1, and the band 430 is also moved in the direction d1 to be taut.

If the plurality of sensors 421, 422, 423, 424, 425, 426, 427 and 428 senses that variance in pressure acting on the face pad 410 or atmospheric pressure reaches a predetermined level, the adjusting unit 440 stops operating the first motor 443 and stops rotating the first shaft 445 in the first direction r1. Subsequently, in order to prevent the first shaft 445 from being rotated in the second direction r2, the adjusting unit 440 eliminates force acting on the first protrusion 441*b* in the direction p1 by the third motor 443, and moves the first stopper 441 in the direction p2 by tensile force of the third spring 451 that is the tension spring.

The first stopper 441 moves in the direction p2 to engage with a first gear 445*a* located at an upper position of the first stopper 441 and to prevent the first shaft 445 from being rotated in the second direction r2.

Therefore, in the electronic device 30 according to the present disclosure, the sensing unit 420 measures pressure between the user's face and the face pad 410, and the adjusting unit 440 automatically adjusts the length of the band 430 according to the measured value, thus significantly increasing the convenience of use.

Hereinafter, the method in which the electronic device 30 according to the present disclosure automatically adjusts the length of the band will be described with reference to FIGS. 21 to 24.

Figure 21:
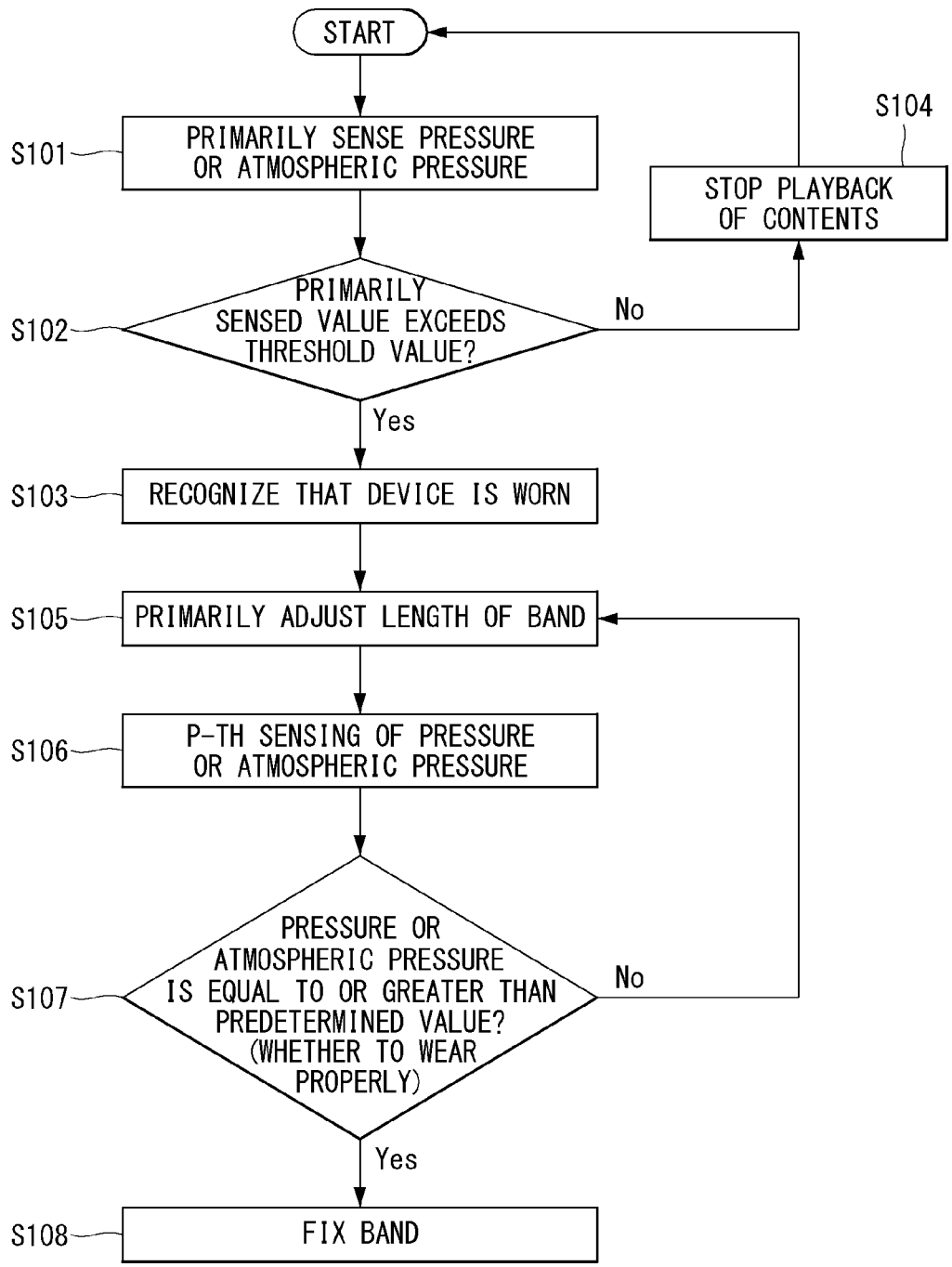
FIG. 21 is a flowchart illustrating a process where the electronic device 30 according to the present disclosure adjusts the length of the band.
Figure 22:
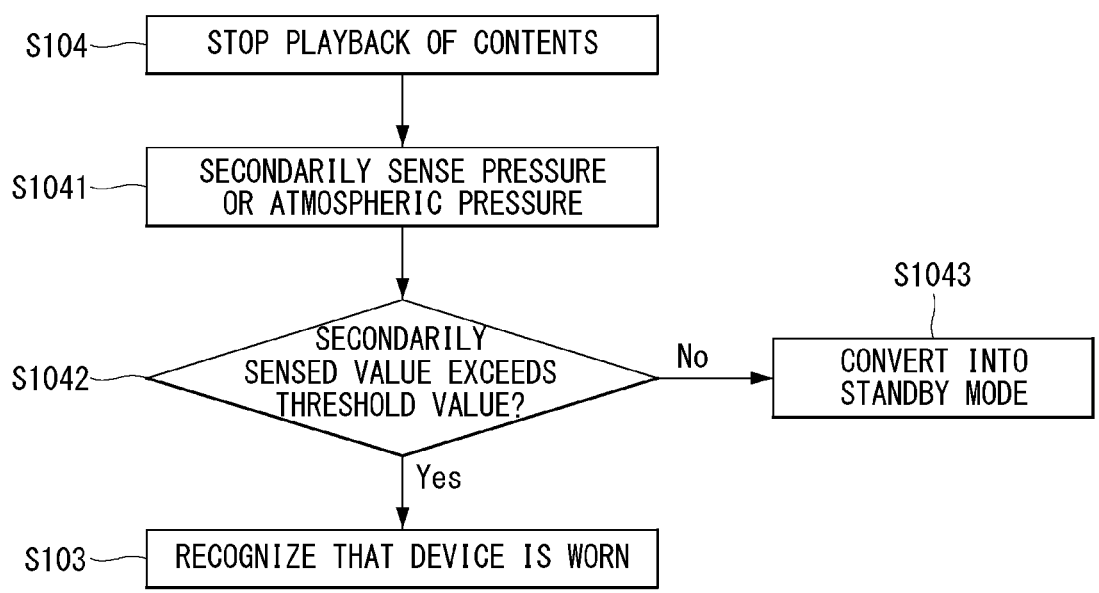
FIGS. 22 and 23 are flowcharts illustrating scenarios in which the electronic device 30 according to the present disclosure is not worn or not properly worn on the head of the user.
Figure 23:
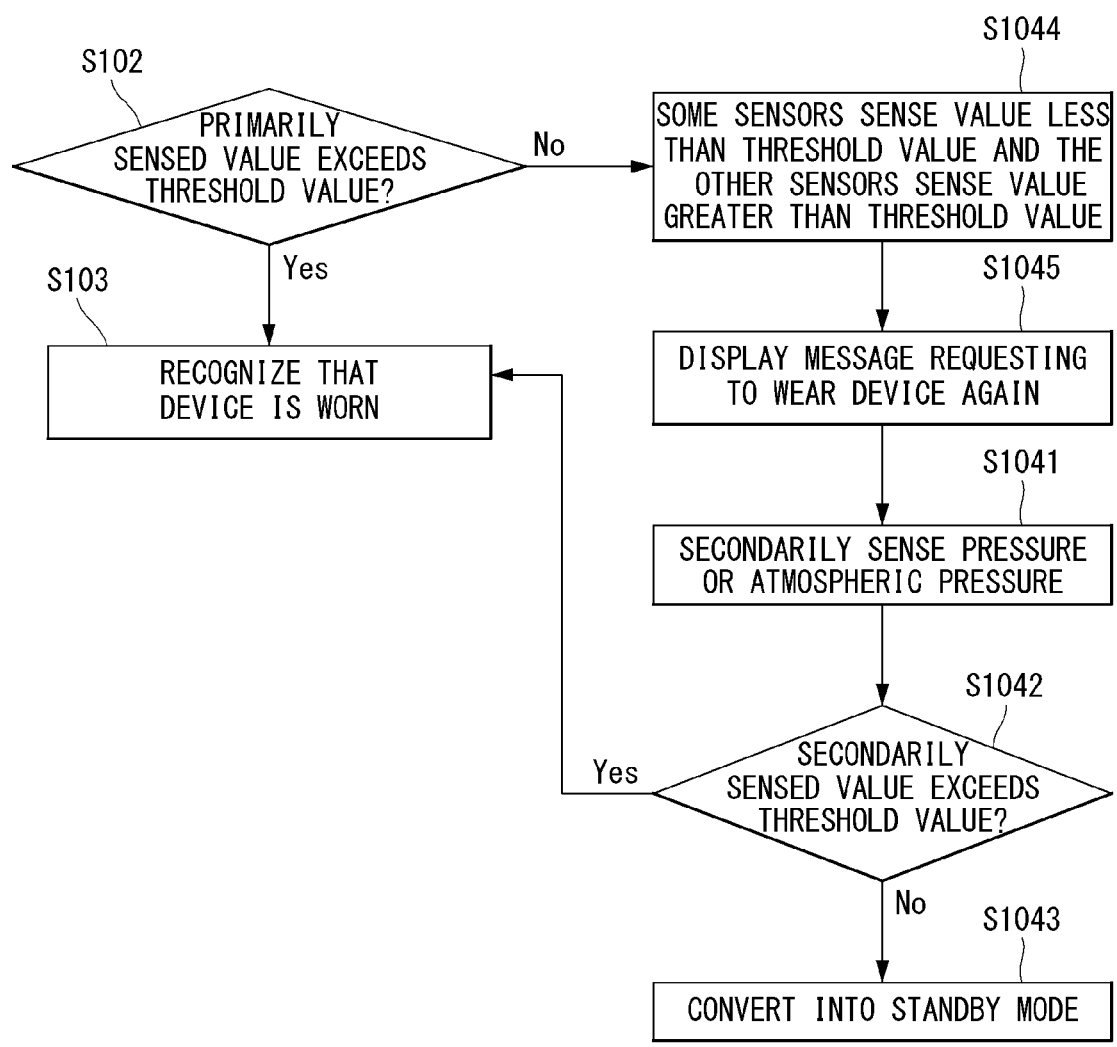
Figure 24:
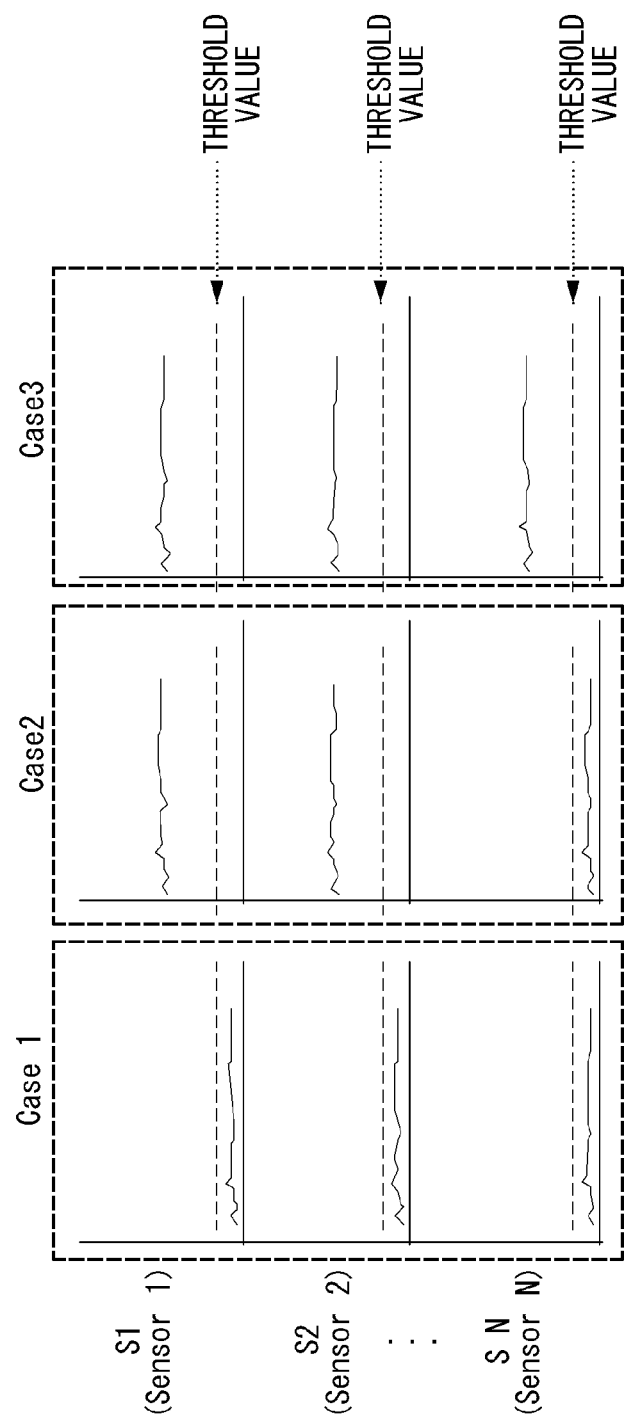
FIG. 24 is a diagram illustrating sensing data measured by sensors according to the present disclosure in various situations.

FIG. 21 is a flowchart illustrating a process of adjusting the band by the electronic device 30 according to the present disclosure, FIGS. 22 and 23 are flowcharts illustrating scenarios in which the electronic device 30 according to the present disclosure is not worn or not properly worn on the head of the user, and FIG. 24 is a diagram illustrating sensing data measured by the sensors according to the present disclosure in various situations.

Referring to FIG. 21, the sensing unit 420 primarily senses the value of pressure or atmospheric pressure generated between the face contact unit 410 and the user's face, at step S101. Subsequently, the adjusting unit 440 determines whether the primarily sensed pressure or atmospheric pressure value exceeds a threshold value, at step S102. If the primarily sensed pressure or atmospheric pressure value exceeds the threshold value, it is determined that the user wears the electronic device on his or her head at step S103.

Furthermore, the adjusting unit 440 primarily adjusts the length of the band 430 to fix the electronic device 30 to the user's head, at step S105.

A process of adjusting the length of the band 430 by the adjusting unit 440 is as follows.

The adjusting unit 440 controls to rotate the first motor 443 in the first direction r1. At this time, the first shaft 445 connected to the first motor 443 is rotated in the first direction r1, and the first wire 447 is wound around the body portion of the first shaft 445. Therefore, the first clip 431 connected to the first wire 447 is moved in the direction d1, and the band 430 is also moved in the direction d1 to be taut.

Meanwhile, if the length of the band 430 is primarily adjusted, the sensing unit 420 secondarily senses the value of pressure or atmospheric pressure generated between the face contact unit 410 and the face at step S1041, and the adjusting unit 440 determines whether the secondarily sensed pressure or atmospheric pressure value is equal to or greater than a predetermined value at step S1042.

In this case, the predetermined number is a number that is preset in the adjusting unit 440 and is greater than the threshold value. Furthermore, since the pressure acting on the face pad 410 or the atmospheric pressure value in the face pad 410 is a previously measured value or number while the user properly comes into contact with the display unit 400, this is a reference number that may be used to determine whether the user properly wears the electronic device 30 according to the present disclosure.

Meanwhile, at step S1042, when it is determined that the secondarily sensed pressure or atmospheric pressure value is equal to or greater than a predetermined value, the adjusting unit 440 fixes the length of the band 430 so as not to stretch at step S108.

A step of fixing the length of the band 430 is as follows.

If the plurality of sensors 421, 422, 423, 424, 425, 426, 427 and 428 senses that variance in pressure or atmospheric pressure acting on the face pad 410 reaches a predetermined level, the adjusting unit 440 stops operating the first motor 443 and stops rotating the first shaft 445 in the first direction r1.

Subsequently, in order to prevent the first shaft 445 from being rotated in the second direction r2, the adjusting unit 440 eliminates force acting on the first protrusion 441b in the direction p1 by the third motor 443, and moves the first stopper 441 in the direction p2 by the tensile force of the third spring 451 that is the tension spring.

The first stopper 441 moves in the direction p2 to engage with a first gear 445a located at an upper position of the first stopper 441 and to prevent the first shaft 445 from being rotated in the second direction r2.

Meanwhile, at the above-described step S102, when the adjusting unit 440 determines that both the primarily measured pressure value and atmospheric pressure value are less than threshold values, as illustrated in FIG. 22, the adjusting unit 440 may transmit a contents playback stop request to the control unit 27, and the control unit 27 receiving the request may stop the playback of the contents that are being played by the electronic device 30 at step S104.

Furthermore, at step S102, when the adjusting unit 440 determines that both the primarily measured pressure value and atmospheric pressure value are less than the threshold values, all sensors included in the sensing unit 420 indicate measured data as shown in case 1 of FIG. 24. That is, when the user does not wear the electronic device 30, case 1 of FIG. 24 shows sensing data measuring the pressure value or atmospheric pressure value generated between the face contact unit 410 and the face, using the sensing unit 420. Here, it can be seen that data measured or detected from all sensors included in the sensing unit 420 is below the threshold value.

Meanwhile, if the contents stop playing, the sensing unit 420 secondarily senses a pressure value or an atmospheric pressure value generated between the face contact unit 410 and the face at step S1041, and the adjusting unit 440 determines whether the secondarily sensed pressure or atmospheric pressure value exceeds the threshold value at step S1042. At this time, the sensing unit 420 may be configured to sense the pressure or the atmospheric pressure value generated between the face contact unit 410 and the face at a predetermined period for a predetermined time, for example, at the period of 30 seconds for 5 minutes. As another example, the sensing unit may be configured to sense the pressure or the atmospheric pressure value generated between the face contact unit 410 and the face at the period of 10 seconds for 1 minute. Although the predetermined time and the predetermined period may be set by the user, they may be set by a factory and a set value may be changed.

If all the pressure and the atmospheric pressure values measured by each sensor are less than the threshold values at step S1042, the adjusting unit 440 may request the control unit 27 that the electronic device 30 is converted into a standby state, and the control unit 27 receiving the request may convert the electronic device 30 into the standby state at step S1043.

Meanwhile, at the above-described step S102, some of the sensors included in the sensing unit 420 measure the pressure value or atmospheric pressure value less than the threshold value, while the other sensors measure the pressure value exceeding the threshold value or the atmospheric pressure variance at step S1044. In this case, the adjusting unit 440 may determine that the user wears the electronic device 30 on his or her head, but the electronic device is not properly worn so that the user feels comfortable while the display unit 400 covering both eyes.

In this case, the pressure value or atmospheric pressure value generated between the face contact unit 410 and the face measured by the sensing unit 420 is shown in case 2 of FIG. 24. That is, case 2 of FIG. 24 shows sensing data measuring the pressure value or the atmospheric pressure value generated between the face contact unit 410 and the face, using the sensing unit 420, when the user incorrectly wears the electronic device 30.

Meanwhile, the adjusting unit 440 may transmit a request to adjust the length of the band 430 or a request to wear the electronic device again to the control unit 27, and the control unit 27 may display a message requesting the user to readjust the length of the band 430 or a message requesting to take off the electronic device 30 and then wear the electronic device on the head again at step S1045.

Thereafter, the sensing unit 420 secondarily senses the pressure value or the atmospheric pressure value generated between the face contact unit 410 and the face at step S1041, and the adjusting unit 440 determines whether the secondarily sensed pressure or atmospheric pressure value exceeds the threshold value at step S1042. At this time, the sensing unit 420 may be configured to sense the pressure or the atmospheric pressure value generated between the face contact unit 410 and the face at a predetermined period for a predetermined time, for example, at the period of 60 seconds for 10 minutes. As another example, the sensing unit may be configured to sense the pressure or the atmospheric pressure value generated between the face contact unit 410 and the face at the period of 15 seconds for 3 minutes. Although the predetermined time and the predetermined period may be set by the user, they may be set by a factory and a set value may be changed.

If the pressure value and the atmospheric pressure value measured by each sensor are less than the threshold values at step S1042, the adjusting unit 440 may request the control unit 27 that the electronic device 30 is converted into the standby state, and the control unit 27 receiving the request may convert the electronic device 30 into the standby state at step S1043.

However, if the secondarily sensed pressure and the atmospheric pressure value exceed the threshold values at step S1042, the adjusting unit 440 determines that the user wears the electronic device on the head at step S103, and the length of the band 430 may be adjusted as in step S105.

In this case, the pressure value or the atmospheric pressure value between the face contact unit 410 and the face measured by the sensing unit 420 is shown in case 3 of FIG. 24. That is, case 3 of FIG. 24 shows sensing data measuring the pressure value or the atmospheric pressure value generated between the face contact unit 410 and the face, using the sensing unit 420, when the user properly wears the electronic device 30 on the face.

Hereinafter, a method in which the electronic device 30 according to the present disclosure determines the movement of the user's eyeball will be described with reference to FIGS. 25 to 32.

Figure 25:
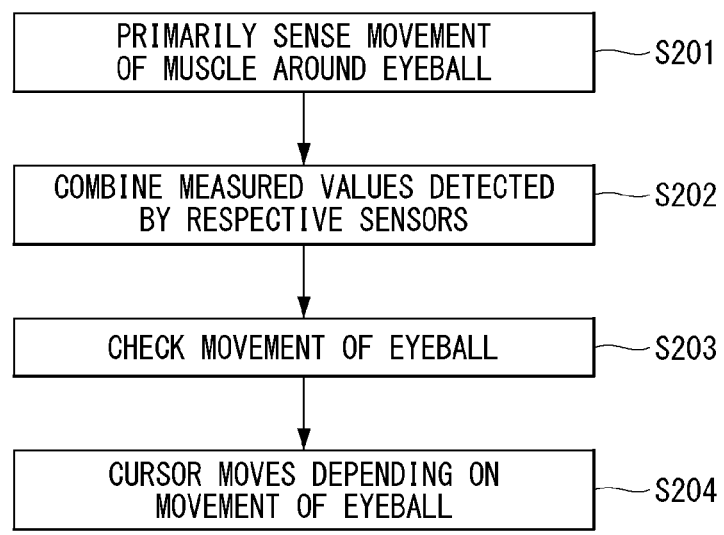
FIG. 25 is a flowchart illustrating a process of determining the movement of a user's eyeball by the electronic device according to the present disclosure.
Figure 26:
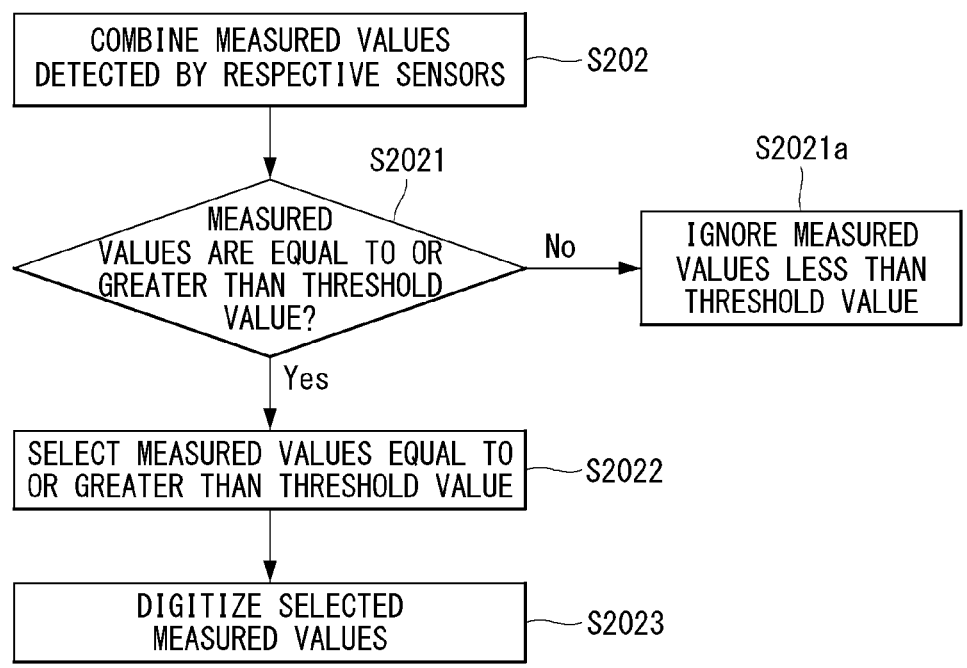
FIG. 26 is a flowchart illustrating a process of digitizing sensing data by the electronic device according to the present disclosure.
Figure 27:
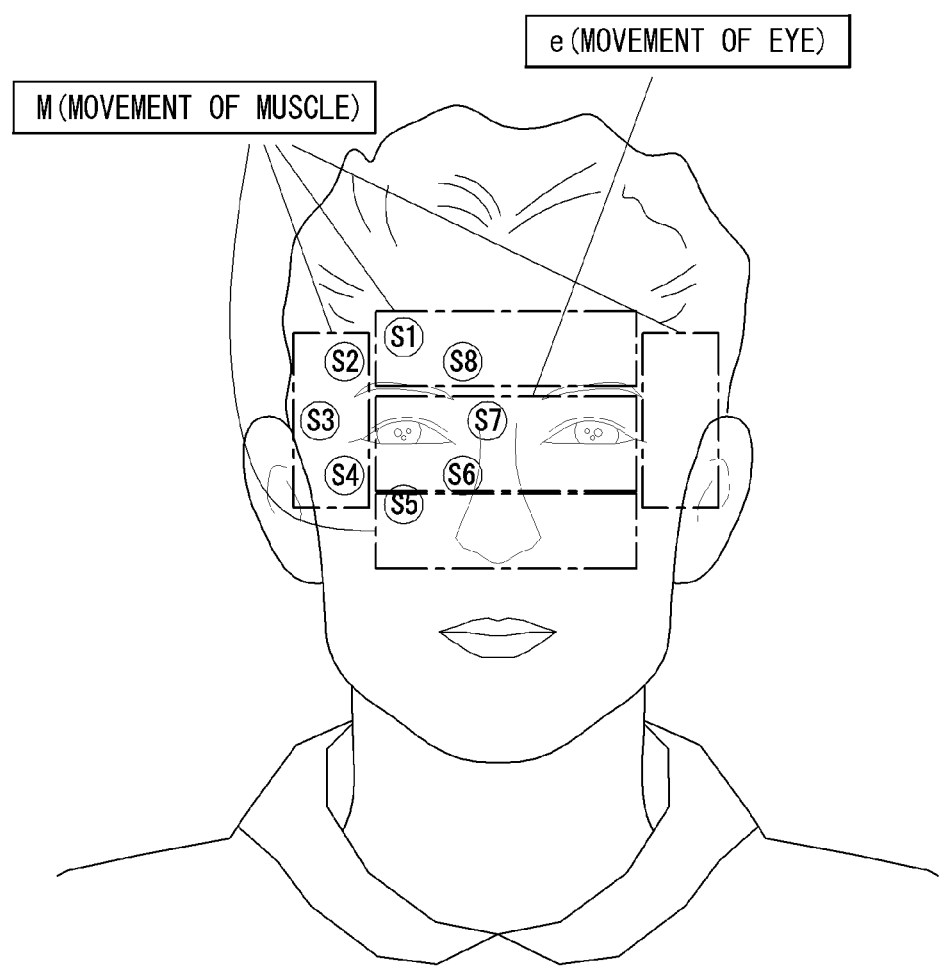
FIG. 27 is a diagram illustrating muscle required for a user to move the eyeball.
Figure 28:
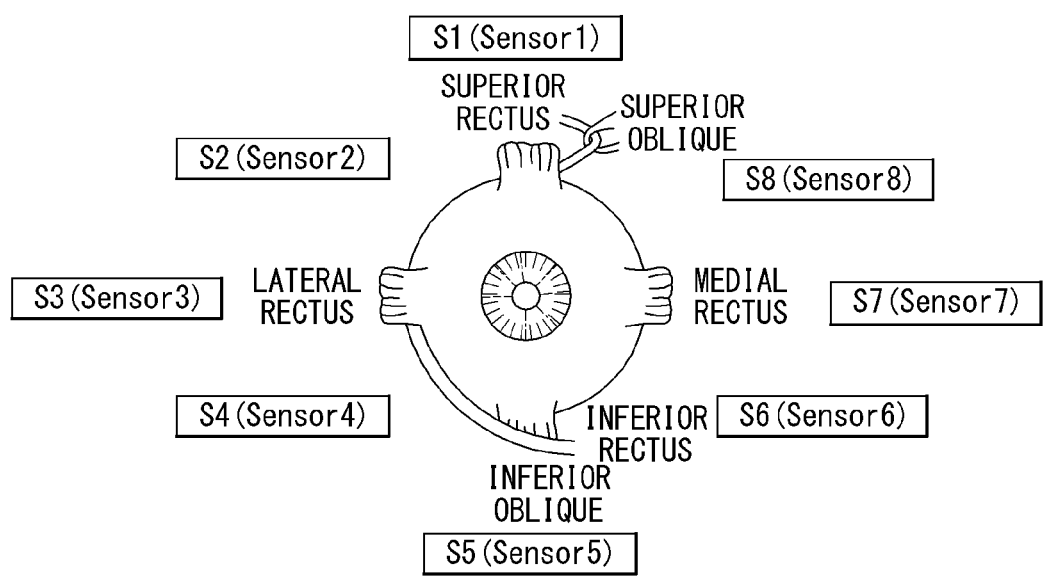
FIG. 28 is a diagram illustrating the arrangement of sensors for sensing the movement of the muscle.
Figure 29:
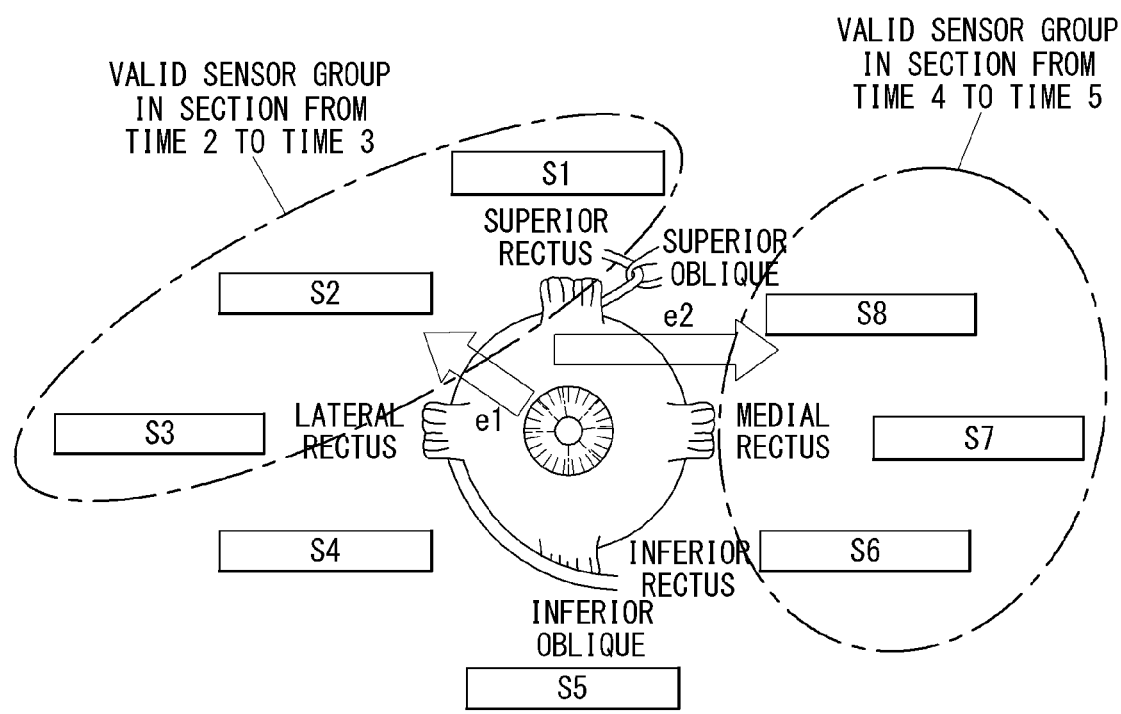
FIG. 29 is a diagram illustrating a process in which the sensors for sensing the movement of the muscle are grouped.
Figure 30:
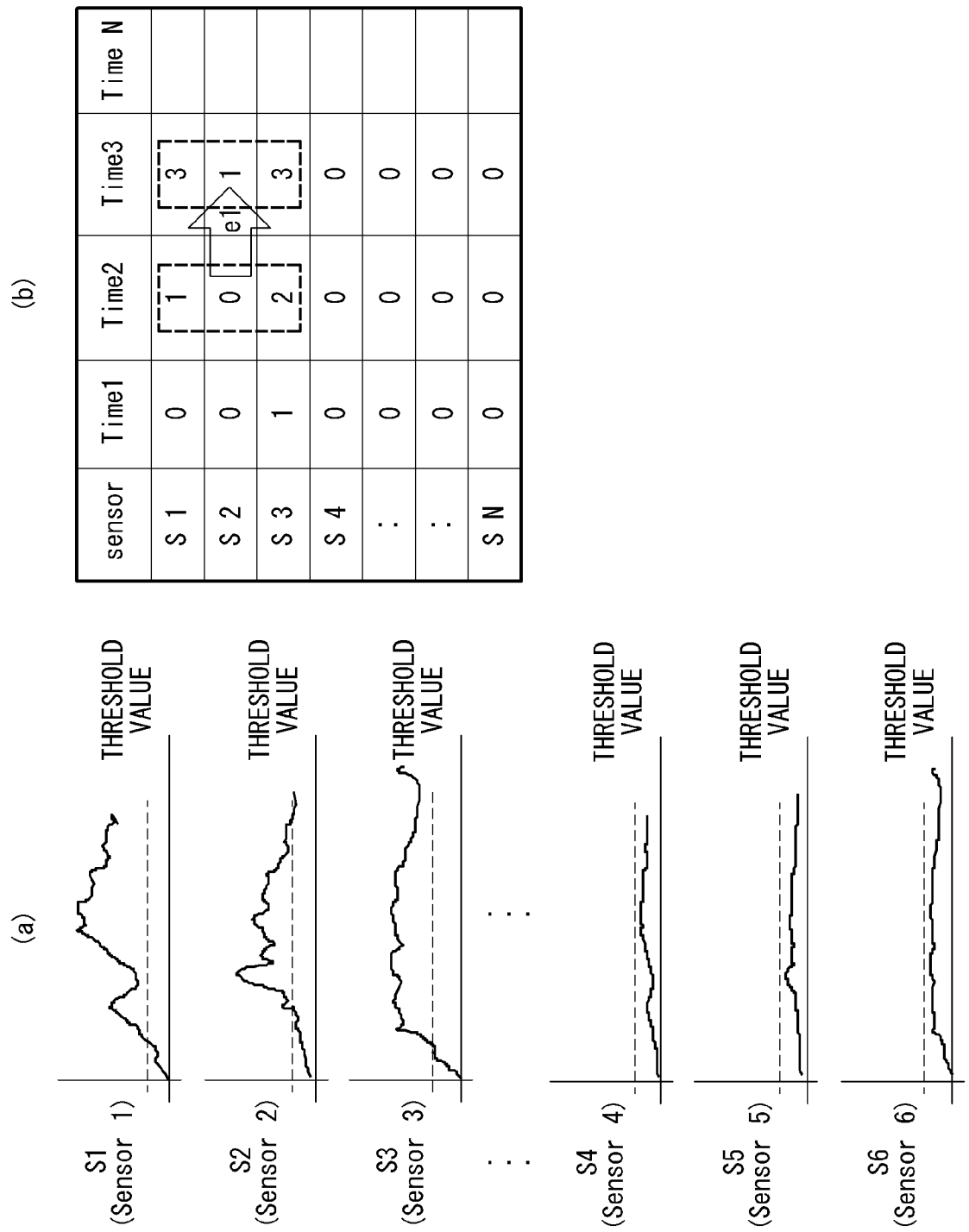
FIG. 30 is a diagram illustrating measured values detected by the sensors, when the eyeball is moved in the direction of arrow e1 shown in FIG. 29.
Figure 32:
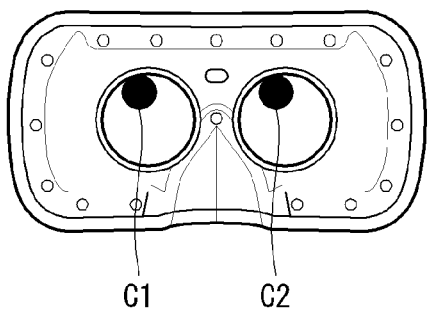
FIG. 32 is a diagram illustrating the operation of a cursor moved depending on the movement of the user's eyeball.
Figure 32:
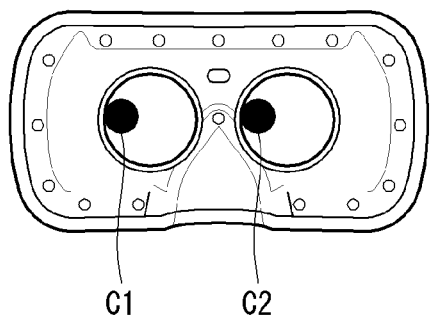
Figure 32:
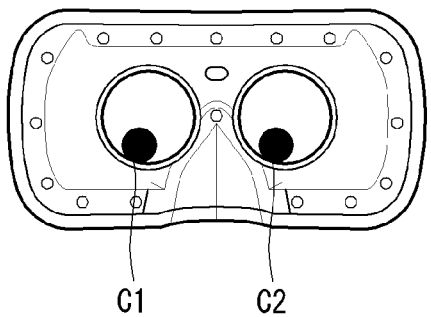
Figure 32:
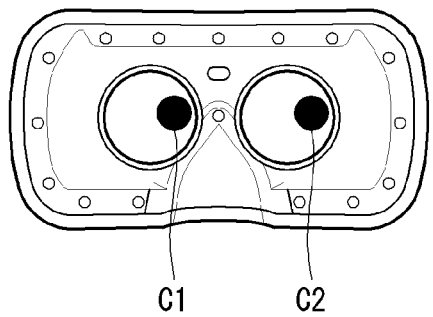

FIG. 25 is a flowchart illustrating a process of determining the movement of the user's eyeball by the electronic device according to the present disclosure, and FIG. 26 is a flowchart illustrating a process of digitizing the sensing data by the electronic device according to the present disclosure. Furthermore, FIG. 27 is a diagram illustrating muscle required for a user to move the eyeball, FIG. 28 is a diagram illustrating the arrangement of sensors for sensing the movement of the muscle, and FIG. 29 is a diagram illustrating a process in which the sensors for sensing the movement of the muscle are grouped. Meanwhile, FIG. 30 is a diagram illustrating measured values detected by the sensors, when the eyeball is moved in the direction of arrow e1 shown in FIG. 29, and FIG. 31 is a diagram illustrating measured values detected by the sensors, when the eyeball is moved in the direction of arrow e2 shown in FIG. 29. FIG. 32 is a diagram illustrating the operation of a cursor moved depending on the movement of the user's eyeball.

First, referring to FIG. 25, the electronic device 30 according to the present disclosure primarily senses the movement of a plurality of muscles connected to the user's eyeball at step S201. Referring to FIGS. 27 and 28, the muscles involved in the movement of the user's eyeball are composed of six muscles. Furthermore, one muscle connected with the movement of the eyeball to move the user's upper eyelid should be further combined with the above-described six muscles.

Referring to FIGS. 27 and 28, six muscles involved in the movement of the user's eyeball are summarized as follows.

Six Muscles Involved in Movement of User's Eyeball

1. Superior rectus: serves to rotate the user's eyeball upwards and/or to the center (when the user looks forwards).
2. Inferior rectus: serves to rotate the user's eyeball downwards and/or to the center (when the user looks forwards).
3. Medial rectus: rotates the user's eyeball to the center (when the user looks forwards).
4. Lateral rectus: rotates the user's eyeball outwards (left side or right side of the user).
5. Inferior oblique: rotates the eyeball upwards and/or outwards (left side or right side of the user).
6. Superior oblique: rotates the eyeball downwards and/or outwards (left side or right side of the user).

The above-described six muscles are dominated by L6SO4 nerve (L6: Lateral rectus is dominated by abducens n. (CN VI), SO4: Superior Oblique is dominated by trochlear n. (CN IV), and the remaining muscles involved in the eyeball are dominated by oculomotor n. (CN III).

Meanwhile, one muscle involved in the movement of the user's upper eyelid is as follows.

Muscle for Raising User's Upper Eyelid

Levator palpebrae superioris: is dominated by oculomotor n., starts from arteria supraorbitalis and stops on the upper eyelid.

In order to sense the movement of the above-described six muscles, the sensing unit 420 according to the present disclosure arranges the respective sensors as illustrated in FIG. 28 to be in contact with the periphery of the user's eyeball. These sensors may be composed of at least eight sensors, which may be referred to as first to eighth sensors.

Referring to FIG. 29, when the user's eyeball, namely, the eye moves in the direction shown by arrow e1, the electronic device 30 according to the present disclosure primarily senses the movement of six muscles connected with the user's eyeball through the first to eighth sensors included in the sensing unit 420 at step S201.

Subsequently, the electronic device 30 combines measured values detected at step S201 by respective sensors at step S202, and determines which direction the user's eyeball rotates or moves at step S203.

Particularly, at step S202, in order to combine the measured values detected by the respective sensors, as illustrated in FIG. 26, it is determined whether the measured values detected by the first to eighth sensors are equal to or greater than threshold value at step S2021. That is, as illustrated in FIG. 30A, if the user's eyeball moves in the direction shown by arrow e1, the first to eighth sensors measure the movement caused by the contraction of six muscles around the user's eyeball at step S201, and determines whether the values measured by the respective sensors are equal to or greater than the threshold value at step S2021.

As illustrated in FIG. 30A, measured values that are equal to or greater than the threshold value are detected only by only the first to third sensors, while the measured values that are equal to or greater than the threshold value are not detected by the remaining fourth to eighth sensors. In order to precisely measure the movement of the user's eyeball, the electronic device 30 discards or ignores measured values less than the threshold value at step S2021a.

Subsequently, the electronic device 30 selects the values measured by the first to third sensors, which are equal to or greater than the threshold value, among the measured values detected by the first to eighth sensors at step S2022, and subtracts the threshold value from the values measured by the first to third sensors.

Furthermore, the electronic device 30 digitizes the measured values of the first to third sensor from which the threshold value is subtracted, in the form of a sensing value table as the function of time as illustrated in FIG. 30B at step S2023. Referring to FIG. 30B, when the user's eyeball looks forwards and moves in direction e1, it can be seen that the muscle around the user's eyeball contracts in a section from Time 2 to Time 3. At this time, while the electronic device 30 digitizes the values measured by the sensor at step S2023, as illustrated in FIG. 29, specific sensors may be grouped so that only sensors detecting a valid measured value in the section from Time 2 to Time 3 are intensively monitored. Thus, the first to third sensors for sensing the muscle involved in the movement of the user's eyeball in the section from Time 2 to Time 3 may be grouped as a first sensor group.

Meanwhile, after Time 3 as illustrated in FIG. 29, when the user's eyeball moves in direction e2, it can be seen that the measured value which is equal to or greater than the threshold value is detected in the sixth to eighth sensors. Therefore, as illustrated in FIG. 31, the electronic device 30 ignores the measured value detected by the first to third sensors in a section from Time 3 to Time 4, and digitizes values measured by the sixth to eighth sensors, thus being used to determine the movement of the eyeball.

Furthermore, as illustrated in FIG. 29, the sixth to eighth sensors may be grouped as a second sensor group so that only sensors detecting a valid measured value in the section from Time 3 to Time 4 are intensively monitored.

The electronic device 30 generates coordinate data on the movement of the cursor on the display part 32*b*, based on digitized data on the movement of the user's eyeball, and moves the cursor to the generated coordinate at step S204. Therefore, as illustrated in FIG. 32, the electronic device 30 according to the present disclosure may move the cursor displayed on the display part 32*b* in response to the movement of the user's eyeball. That is, if the user looks with his or her eyes facing leftwards and upwards, as illustrated in FIG. 32A, cursors c1 and c2 corresponding to the user's both eyes face leftwards and upwards on the display part 32*b*. Moreover, if the user looks with his or her eyes facing leftwards and downwards, as illustrated in FIG. 32B, the cursors c1 and c2 corresponding to the user's both eyes face leftwards and downwards on the display part 32*b*. Furthermore, if the user looks with his or her eyes facing leftwards, as illustrated in FIG. 32C, the cursors c1 and c2 corresponding to the user's both eyes face leftwards on the display part 32*b*. If the user's eyes look to the right, as illustrated in FIG. 32D, the cursors c1 and c2 face rightwards on the display part 32*b*.

Since the electronic device 30 according to the present disclosure may move the cursor on the display only by the movement of the user's eyeball, it is more convenient for the user to use the electronic device 30.

Hereinafter, the method in which the electronic device 30 according to the present disclosure determines a change in a user's facial expression will be described with reference to FIGS. 33 to 35.

Figure 33:
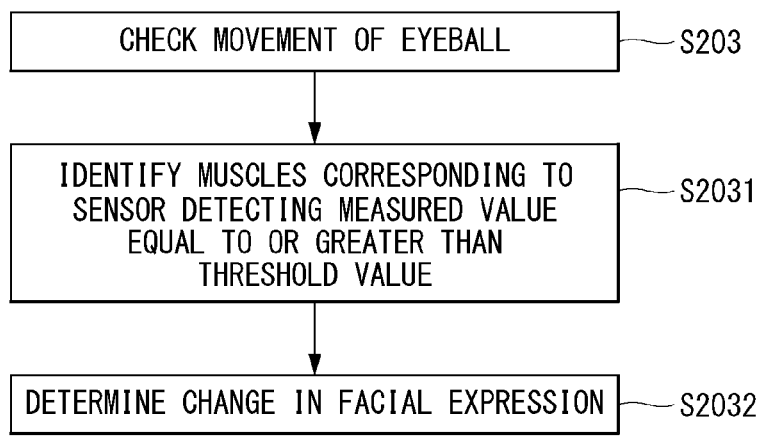
FIG. 33 is a flowchart illustrating steps of determining a change in a user's facial expression by the electronic device 30 according to the present disclosure.
Figure 34:
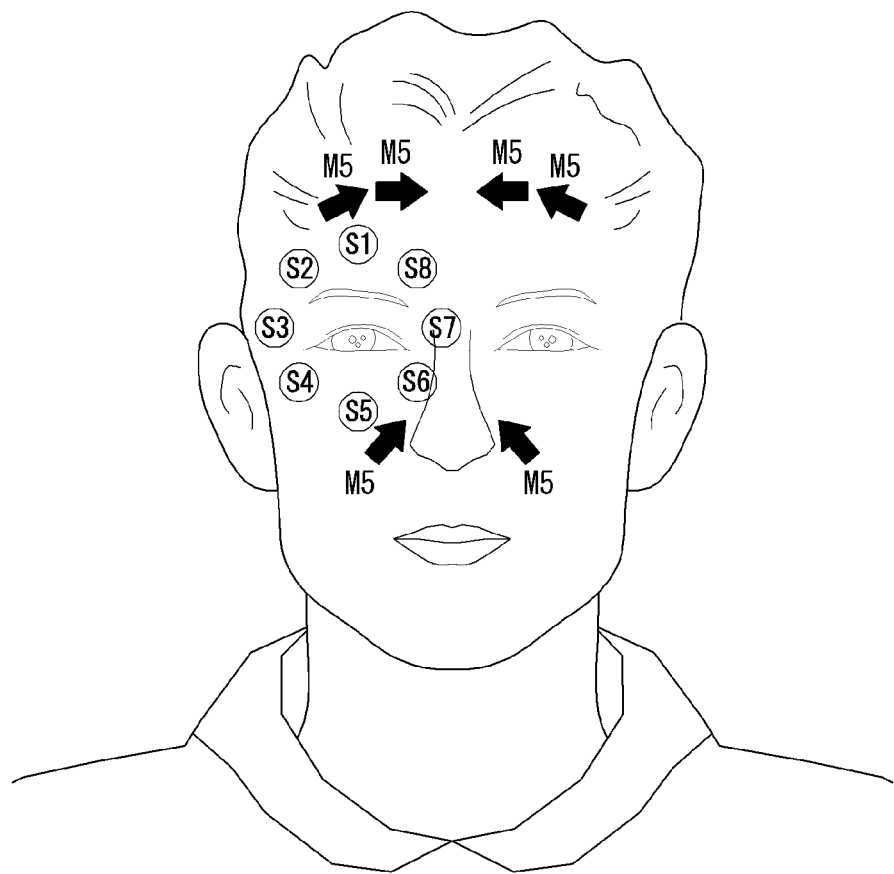
FIG. 34 is a diagram illustrating muscles related to the change in the user's facial expression.
Figure 35:
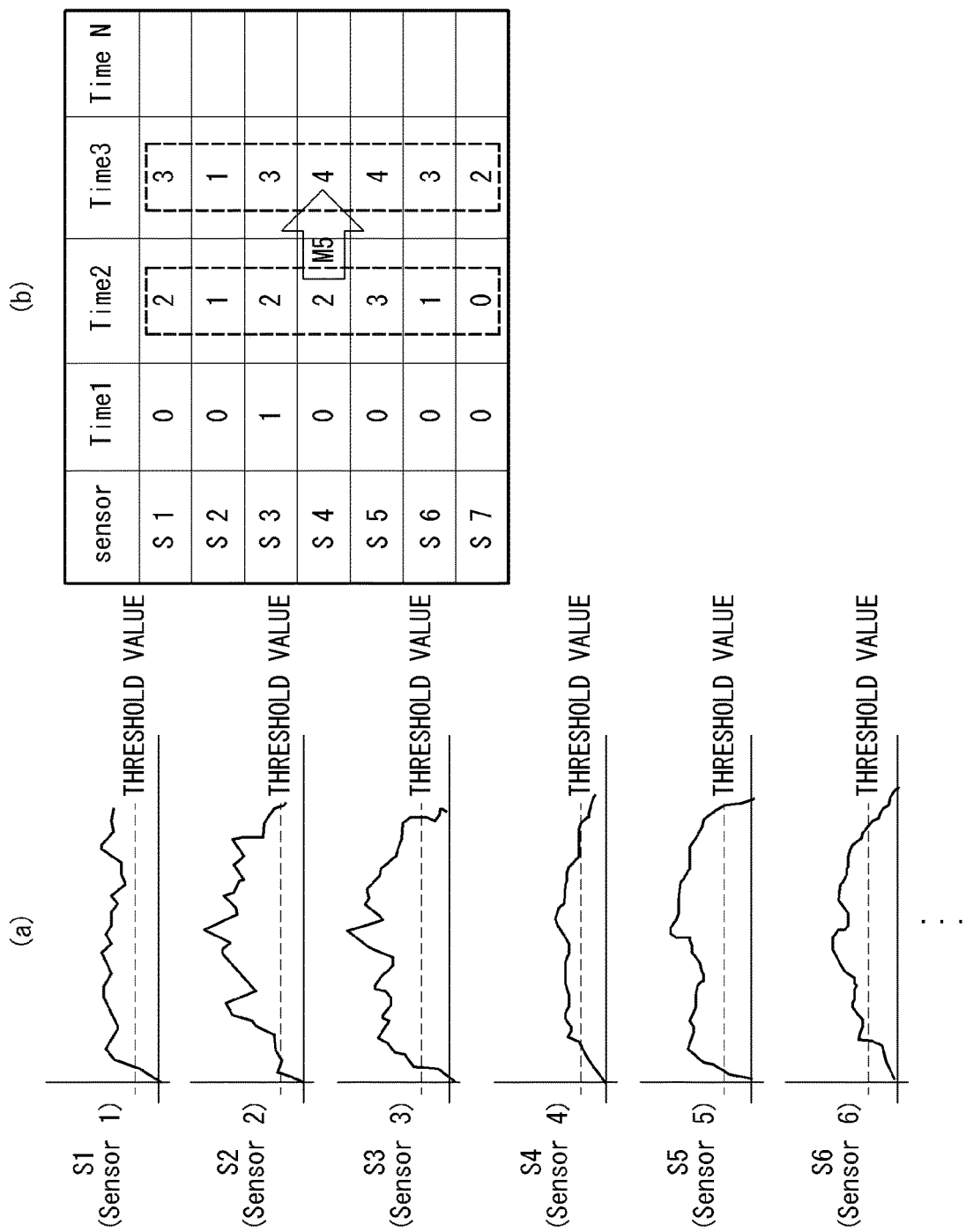
FIG. 35 is a diagram illustrating a value measured by the sensor, when the user's facial expression is changed.

FIG. 33 is a flowchart illustrating steps of determining the change in the user's facial expression by the electronic device 30 according to the present disclosure, FIG. 34 is a diagram illustrating muscles related to the change in the user's facial expression, and FIG. 35 is a diagram illustrating a value measured by the sensor, when the user's facial expression is changed.

First, referring to FIG. 33, after step S203 of determining which direction the user's eyeball is rotated or moved, the electronic device 30 checks locations where the sensors detecting the measured values that are equal to or greater than the threshold value among values measured by the sensors included in the sensing unit 420 are located. Furthermore, muscles corresponding to the locations where the sensors are located are identified among the muscles of the user's face at step S2031. Meanwhile, information about the locations of the sensors and the placement of the muscles of the user's face is previously stored in the electronic device 30.

That is, as illustrated in FIG. 34, all information about the muscles included in the user's face is embedded in the electronic device 30, and information about directions in which the muscles are contracted or relaxed is also stored. Furthermore, each sensor has a preset target muscle for detecting contraction and relaxation.

Based on the information, the electronic device 30 determines that muscles corresponding to the sensors detecting the measured value that is equal to or greater than the threshold value are contracted, and determines how the user's facial expression is changed by identifying the contracted direction of the contracted muscles at step S2032.

Referring to FIGS. 34 and 35, when the user makes contortions of the face, the respective muscles included in the user's face may be moved in a direction shown by arrow M5 as illustrated in FIG. 34. In this case, as illustrated in FIG. 35A, the sensors included in the sensing unit 420 may measure the pressure or atmospheric pressure change value equal to or greater than the threshold value for each muscle, and the electronic device 30 collects measured values that are equal to or greater than the threshold value to digitize data measured for each sensor.

Subsequently, as illustrated in FIG. 35B, the electronic device 30 compares the measured value for each muscle at Time 2 with the measured value for each muscle at Time 3 to determine which muscle is contracted or relaxed among the muscles included in the user's face. Furthermore, the electronic device 30 may use the previously stored information to analyze how the user's expression is changed by the contracted or relaxed muscles.

Furthermore, the electronic device 30 according to the present disclosure may change whether to provide the contents as the user's facial expression changes. Hereinafter, a method where the electronic device 30 according to the present disclosure senses a change in the user's facial expression to determine whether to provide the contents will be described with reference to FIG. 36.

Figure 36:
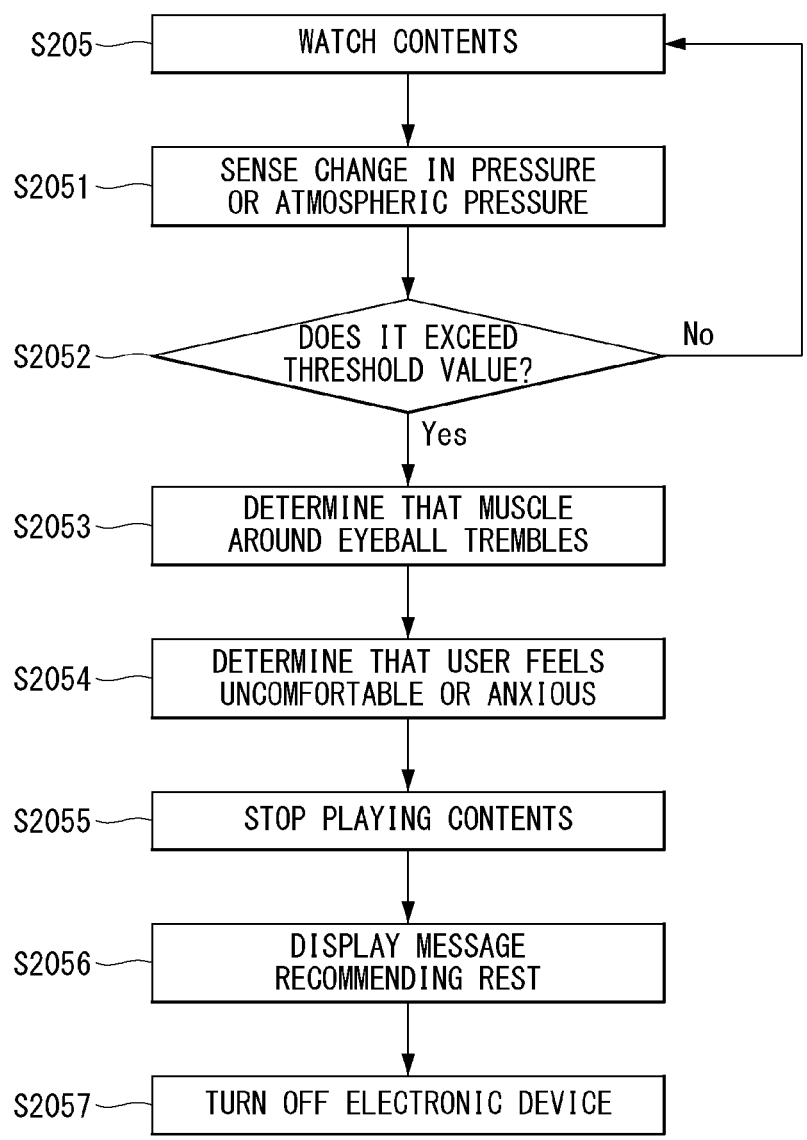
FIG. 36 is a flowchart illustrating a method of determining whether the electronic device 30 of the present disclosure provides contents depending on the change in the user's expression.

FIG. 36 is a flowchart illustrating a method of determining whether the electronic device 30 of the present disclosure provides contents depending on the change in the user's expression.

First, if the user wears the electronic device 30 on his or her head and the contents are selected by moving the cursor as the eyeball moves in the state where the length of the band is adjusted, the selected contents are played. Furthermore, the user may watch the contents that are being played at step S205.

If emotions the user feels while watching the contents cause a change in facial expression, the sensing unit 420 measures a change in pressure or atmospheric pressure between the face contact unit 410 and the face by the contraction and relaxation of the muscle of the user's face at step S2051.

Meanwhile, when it is determined whether the pressure or atmospheric pressure change value exceeds the threshold value, the electronic device 30 continues to play the contents if the change value does not exceed the threshold value at step S2052. However, if the pressure or atmospheric pressure change value exceeds the threshold value, it is determined that the muscle around the eyeball trembles and thereby the user's expression has been changed at step S2053.

As soon as the pressure or atmospheric pressure change value exceeds the threshold value, the electronic device 30 determines whether it corresponds to a data value indicating the specific facial expression of the user, which is previously stored.

The specific facial expression includes a facial expression when the user feels anxious or uncomfortable. Therefore, when the user feels anxious or uncomfortable, the electronic device 30 according to the present disclosure may previously store data on change in pressure or atmospheric pressure between the face contact unit 410 and the face, which is caused by the contraction or relaxation of the face muscle or the muscle around the eyeball.

If it is determined that the user's expression is changed at step S2053, the electronic device 30 may compare the pressure or atmospheric pressure change value between the face contact unit 410 and the face with the previously stored data value of the user's facial expression. Furthermore, when the measured value is equal or similar to a data value about the facial expression when the user feels uncomfortable or anxious, the electronic device 30 may determine that the user feels anxious or uncomfortable while watching the contents at step S2054.

Subsequently, the electronic device 30 may pause or stop the playback of the contents at step S2055, and may display a message requesting a user to stop watching the contents and take a rest through the display unit at step S2056.

When the user does not separately operate the electronic device 30 for a predetermined period of time, the electronic device 30 itself may enter a standby mode or turn power off at step S2057.

As such, when the user feels uncomfortable or anxious depending on the change of the user's expression, the electronic device 30 according to the present disclosure may stop playing the contents and advise the user to take a rest, the user can be protected from harmful contents.

Some or other embodiments of the invention described above are not exclusive or distinct from each other. It should be noted that some or other embodiments of the invention described above may be combined in configuration or function.

For example, it is to be understood that component A described in certain embodiments and/or drawings may be combined with component B described in other embodiments and/or drawings. That is, even if the combination of components is not described directly, the combination is possible unless otherwise indicated.

Therefore, the above embodiments are to be construed in all aspects as illustrative and not restrictive. The scope of the invention should be determined by the appended claims, and all changes coming within the meaning and equivalency range of the appended claims are intended to be embraced therein.

What is claimed is:

1. An electronic device worn on a user's head, comprising:
   a display part configured to display a virtual image or picture in front of the user's eyes; and
   a band coupled with the display part to surround the user's head,
   wherein the display part further comprises:
   a face contact part coming into contact with the user's face;
   a sensing part configured to sense whether the face comes into contact with the face contact part; and
   an adjusting part configured to adjust a length of the band,
   wherein the adjusting part adjusts the length of the band using data sensed by the sensing part, and
   wherein the adjusting part comprises:
   a first shaft and a second shaft rotatable in a first direction and a second direction;
   a first motor and a second motor configured to rotate the first shaft and the second shaft in the first direction; and
   a first stopper and a second stopper configured to stop rotary movement of the first shaft and the second shaft,
   wherein the first shaft, the first motor and the first stopper are arranged to correspond to a left side of the user's head, and the second shaft, the second motor and the second stopper are arranged to correspond to a right side of the user's head, and
   the first shaft, the first motor and the first stopper are arranged to be symmetrical with the second shaft, the second motor and the second stopper.

2. The electronic device of claim 1, wherein the face contact part further comprises a face pad.

3. The electronic device of claim 2, wherein the sensing part comprises a plurality of sensors, and
   the sensors are arranged inside the face pad to be spaced apart from each other at regular intervals.

4. The electronic device of claim 3, wherein the plurality of sensors comprises at least first to eighth sensors.

5. The electronic device of claim 3, wherein the plurality of sensors comprises at least one of a pressure sensor and an atmospheric pressure sensor.

6. The electronic device of claim 1, further comprising:
   a control part configured to control and process a signal, data and information inputted into or outputted from the electronic device,
   wherein the sensing part is electronically connected to the control part to transmit or receive the data to or from the control part.

7. The electronic device of claim 1, wherein the band further comprises a first clip and a second clip mounted on opposite ends of the band, respectively.

8. The electronic device of claim 7, further comprising:
   a first wire connecting the first clip with the first shaft; and
   a second wire connecting the second clip with the second shaft,
   wherein the first wire is wound around the first shaft, when the first shaft rotates in the first direction, and
   the second wire is wound around the second shaft, when the second shaft rotates in the second direction.

9. The electronic device of claim 1, further comprising:
   a first spring configured to rotate the first shaft in the second direction, and a second spring configured to rotate the second shaft in the first direction.

10. The electronic device of claim 9, wherein each of the first spring and the second spring is a torsion spring.

11. The electronic device of claim 1, wherein the first shaft and the second shaft further comprise a first gear and a second gear, respectively,
    the first stopper and the second stopper further comprise a first hook and a second hook, respectively,
    the first gear and the second gear are disposed on an upper portion of the first shaft and an upper portion of the second shaft, respectively,
    the first hook and the second hook are disposed on a first end of the first gear and a first end of the second gear, respectively, and
    the first hook and the second hook are detachably fastened to the first gear and the second gear, respectively.

12. The electronic device of claim 11, wherein the first stopper and the second stopper further comprise a first protrusion and a second protrusion, respectively, and further comprise a third motor and a fourth motor connected to the first protrusion and the second protrusion, respectively, and the third motor and the fourth motor press the first protrusion and the second protrusion, respectively, in a predetermined direction.

13. The electronic device of claim 12, wherein the first stopper and the second stopper further comprise a third spring and a fourth spring, respectively, and the third spring and the fourth spring are coupled to a second end of the first stopper and a second end of the second stopper, respectively, to elastically support the first stopper and the second stopper.

14. The electronic device of claim 13, wherein each of the third spring and the fourth spring is a tension spring.

15. A method of determining a movement of an eyeball of a user wearing an electronic device on the head, the method comprising:

primarily sensing movement of a plurality of muscles connected with the eyeball;

combining measured values detected by respective sensors at the primarily sensing;

determining the movement of the eyeball by determining muscles having a measured value that is greater than or equal to a threshold value among the measured values; and moving a cursor on a display part in response to the movement of the eyeball.

* * * * *